United States Patent [19]

Hayashi et al.

[11] Patent Number: 5,000,991
[45] Date of Patent: Mar. 19, 1991

[54] PROCESS FOR PRODUCING POLYESTER RESIN FOAM AND POLYESTER RESIN FOAM SHEET

[75] Inventors: Motoshige Hayashi, Nara; Norio Amano; Takeshi Taki; Takaaki Hirai, all of Nara, Japan

[73] Assignee: Sekisui Kaseihin Kogyo Kabushiki Kaisha, Nara, Japan

[21] Appl. No.: 443,416

[22] Filed: Nov. 30, 1989

[30] Foreign Application Priority Data

Dec. 1, 1988 [JP] Japan .................................. 63-302233
Jan. 12, 1989 [JP] Japan .................................... 61-3669
Apr. 6, 1989 [JP] Japan ................................... 61-88633
Apr. 7, 1989 [JP] Japan ................................... 61-88300
Sep. 25, 1989 [JP] Japan .................................. 61-250049
Oct. 20, 1989 [JP] Japan .................................. 61-273049

[51] Int. Cl.$^5$ ............................................. B32B 3/26
[52] U.S. Cl. ..................................... 428/36.5; 264/41; 264/46.8; 264/54; 428/319.7; 521/138
[58] Field of Search ........................... 264/41, 46.8, 54; 428/36.5, 319.7; 521/138

[56] References Cited

U.S. PATENT DOCUMENTS 4,119,583 10/1978 Filip et al. ............................ 264/54

Primary Examiner—William J. Van Balen
Attorney, Agent, or Firm—Armstrong, Nikaido, Marmelstein, Kubovcik & Murray

[57] ABSTRACT

A process for producing a thermoplastic polyester resin foam comprising melting a thermoplastic polyester resin, mixing the molten resin with a blowing agent and extruding the mixture into a low-pressure zone to carry out expansion molding, characterized in that a compound having two or more acid anhydride groups per molecule, optionally together with a compound of a metal of Group I, II or III elements of the Periodic Table is added to the thermoplastic polyester resin. There is also disclosed a process for producing a thermoplastic polyester resin foam comprising cooling a high-temperature foam immediately after expansion and then re-heating the foam. Further, a thermoplastic polyester resin foam sheet and a food container prepared from the foam sheet are also disclosed.

21 Claims, 3 Drawing Sheets

PROCESS FOR PRODUCING POLYESTER RESIN FOAM AND POLYESTER RESIN FOAM SHEET

FIELD OF THE INVENTION

This invention relates to a process for producing a thermoplastic polyester resin foam by extrusion, and also relates to a product for a thermoplastic polyester resin foam. This process gives fine cells uniformly formed at a high expansion ratio and does not cause the generation of colored contaminants in the foam even in continuous extrusion operation. It also relates to a thermoplastic polyester resin foam sheet excellent in thermoformability.

The polyester resin foam of the present invention is strong in rigidity, though the foam has a low density and is lightweight. Further, the foam is excellent in heat resistance, chemical resistance, heat insulating properties and shock-absorbing properties and can be widely used. Particularly, the polyester resin foam sheet is suitable for use as a material which can be thermoformed into heat-resistant food containers.

BACKGROUND OF THE INVENTION

Thermoplastic polyester resins such as polyethylene terephthalate and polybutylene terephthalate are excellent in mechanical characteristics, heat resistance, chemical resistance and dimensional stability and are widely used in the fields of injection-molded articles, fibers and films. However, it is difficult that the thermoplastic polyester resins during melting are brought into such viscoelastic properties that foams can be obtained. Hence, a blowing agent is easily released during foam extrusion and it is difficult to obtain good foams wherein fine closed cells are uniformly formed. To solve this problem, there was proposed a method wherein diglycidyl esters are incorporated in aromatic polyesters in the foam extrusion of the aromatic polyesters [see, JP-B-61-48409 (the term "JP-B" as used herein means an examined Japanese patent publication)]. In the foam extrusion of thermoplastic polyesters, there was proposed a method wherein polyfunctional diglycidyl esters and poly-functional carboxylic acid anhydrides are incorporated in thermoplastic polyesters to improve the melt viscosity of the thermoplastic polyesters [see, JP-A-59-210955 (the term "JP-A" as used herein means an "unexamined published Japanese patent application)].

The present inventors have been engaged in the production and study of extruded foams for many years and have had experience in that when the foam extrusion comprising a thermoplastic polyester in admixture with diglycidyl ester compounds is subjected to continuous long run, the resulting foam becomes discolored. The present inventors have continued to make the study and found that when pyromellitic dianhydride is mixed with a thermoplastic polyester without using any diglycidyl ester compound, the resulting foam is not colored and burned even when foam extrusion is continuously conducted over a long period of time.

The present inventors have further continued making the study and found that when compounds having two or more acid anhydride groups per molecule such as pyromellitic dianhydride and compounds of Group I, II or III metals of the Periodic Table are added to thermoplastic polyester resins, the viscoelasticity of the molten materials is improved and at the same time, there can be obtained foams having high tensile elongation and more finer cells.

JP-A-59-135237 (U.S. Pat. Nos. 4,462,947 and 4,466,943, European Patent 0115162A) discloses that polyester resin foam sheets can be thermoformed into heat-resistant food containers which can be used in dual ovenable applications. However, the method disclosed therein has disadvantages in that since not only the melt viscosity is low when a polycarbonate is merely mixed, but carbon dioxide liberated from the polycarbonate is used as a blowing agent, expansion ratio is low, heat resistance is poor and the container cannot bring out bare hands when the articles are used as containers for heating or cooking foods in microwave ovens.

The present inventors have found thermoplastic polyester resin foam sheets having a high expansion ratio, good heat insulating properties and excellent thermofoamability in the above-described study.

SUMMARY OF THE INVENTION

Accordingly, it is an object of the present invention to provide a process for producing a thermoplastic polyester resin foam which is highly expanded by adjusting viscoelastic properties during melting in the extrusion foaming of thermoplastic polyester resins.

It is another object of the present invention to provide a process for producing a thermoplastic polyester resin foam which does not cause the generation of colored contaminants therein even when long-term continuous operation is conducted in the extrusion foaming of thermoplastic polyester resins.

It is still another object of the present invention to provide a process for producing a thermoplastic polyester resin foam having uniform fine cells in the extrusion foaming of thermoplastic polyester resins.

It is another object of the present invention to provide a thermoplastic polyester resin foam excellent in tensile strength and tensile elongation in extrusion foaming.

It is still a further object of the present invention to provide a process for producing a thermoplastic polyester resin foam which is highly expanded and has excellent heat resistance by re-heating an extrusion-expanded thermoplastic polyester resin foam to carry out post-expansion.

It is another object of the present invention to provide an extruded foam sheet of a thermoplastic polyester resin, which is excellent in formability such as thermoformability.

It is still a further object of the present invention to provide a heat-resistant food container which is obtained by thermoforming an extruded foam sheet of a thermoplastic polyester resin and can be used in dual ovenable applications.

The present invention is intended to achieve the above-described objects and the essentials of the present invention resides in that:

(1) a process for producing a thermoplastic polyester resin foam comprising melting a thermoplastic polyester resin, mixing the molten resin with a blowing agent and extruding the mixture into a low-pressure zone to carry out foaming, characterized in that a compound having two or more acid anhydride groups per molecule is added to the thermoplastic polyester resin;

(2) a process for producing a thermoplastic polyester resin foam comprising melting a thermoplastic polyester resin, mixing the molten resin with a blowing agent and extruding the mixture into a low-pressure zone to carry out foaming, characterized in that a compound having two or more acid anhydride groups per molecule and a compound of a metal of Groups I, II or III elements of the Periodic Table are added to the thermoplastic polyester resin;

(3) a process for producing a thermoplastic polyester resin foam comprising cooling a high-temperature thermoplastic polyester resin foam immediately after expansion to a temperature of not higher than the glass transition point of the resin to thereby bring its crystallinity to 30% or lower and then heating the polyester resin foam to 60° C. or higher;

(4) a thermoplastic polyester resin foam sheet which is an extruded foam sheet of a thermoplastic polyester resin and has a crystallinity of not higher than 20% and an molecular orientation ratio of 4.5 or below looking the direction from the surface of foam sheet; and (5) a food container prepared by bonding a non-foam film of a thermoplastic resin to at least one side of a thermoplastic polyester resin foam sheet to obtain a laminated sheet and thermoforming the sheet into a container in such a manner that the non-foam film is positioned inside.

DETAILED DESCRIPTION OF THE INVENTION

Figure 1:
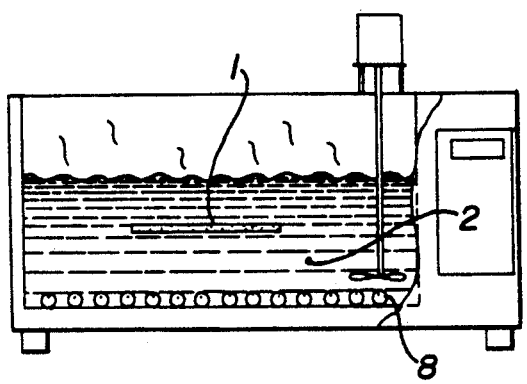
FIGS. 1 to 3 are sectional views of means for carrying out re-heating according to present invention.

In the production of the polyester resin foams the present invention, extruders are used. Thermoplastic polyester resins are melted under an elevated pressure in the extruders and the molten resins are extruded through die into a low-pressure zone to produce foams.

In the production of the polyester resin foams of the present invention, compounds having two or more acid anhydride groups per molecule are added to thermoplastic polyester resins. By adding the compounds having two or more acid anhydride groups per molecule, the viscoelastic properties of the thermoplastic polyester resins during extrusion can be improved, whereby gasified blowing agents can be retained in the interiors of closed cells and uniformly dispersed fine cells can be formed using extruders.

It is believed that the compound having two or more acid anhydride groups per molecule is bonded to OH groups in the molecule chain of the thermoplastic polyester resin and crosslinking gently takes place, whereby the viscoelastic properties of the thermoplastic polyester resin during extrusion can be improved.

The term "viscoelastic properties during melting" can be confirmed by a phenomenon wherein the molten resin is swollen or shrunk from the outlet of die when the molten resin is extruded through the die, and can be generally represented by a die swell ratio. The die swell ratio can be measured when a molten resin is extruded through a round orifice die having a circular section. Die swell ratio can be determined by the following formula.

$$\text{Die swell ratio} = \frac{\text{(Diameter of extruded melt)}}{\text{(Diameter of outlet of die)}}$$

Die swell ratio is an important factor in extrusion foaming. It is preferred that die swell ratio is 2 to 5 in order to obtain foamed articles having a large sectional area and uniformly dispersed fine cells in particular.

In the present invention, a blend of a thermoplastic polyester resin and a compound having two or more acid anhydride groups is molten in an extruder, a blowing agent is generally injected into the molten blend and the resulting molten blend is extruded through the die of the extruder for foaming into a low-pressure zone to produce a foam.

In another embodiment of the present invention, a compound having two or more acid anhydride groups per molecule and further a compound of a metal of Group I, II or III elements of the Periodic Table are added to a thermoplastic polyester resin. In the same manner as that described above, the resulting blend is fed to an extruder to produce a foam. By adding a compound of a metal of Group I, II or III elements of the Periodic Table, there can be obtained a thermoplastic polyester resin foam having finer cells uniformly dispersed therein.

Thermoplastic polyester resins used in the present invention are linear polyesters of poly-condensates of an aromatic dicarboxylic acid component and a diol component.

Examples of dicarboxylic acid components which can be used in the present invention include terephthalic acid, isophthalic acid, naphthalenedicarboxylic acid, diphenyl ether carboxylic acid, diphenyl sulfone dicarboxylic acid and diphenoxyethanedicarboxylic acid.

Examples of diol components which can be used in the present invention include ethylene glycol, trimethylene glycol, tetramethylene glycol, neopentyl glycol, hexamethylene glycol, cyclohexanedimethanol tricyclodecanedimethanol, 2,2-bis(4-$\beta$-hydroxyethoxyphenyl)propane, 4,4-bis($\beta$-hydroxyethoxy)diphenyl sulfone, diethylene glycol and 1,4-butanediol.

Polyethylene terephthalate, polybutylene terephthalate, polybutylene terephthalate elastomer, amorphous polyesters, polycyclohexane terephthalate, polyethylene naphthalate and mixtures thereof are preferably used as the polyesters comprising these dicarboxylic acid components and these diol components. Modified resins composed of at least 50% of these thermoplastic polyester resins can be used.

Any of aromatic acid anhydrides, cyclic aliphatic acid anhydrides, fatty acid anhydrides, halogenated acid anhydrides, etc. can be used as the compounds having two or more acid anhydride groups per molecule, so long as they have at least two acid anhydride groups per molecule. Further, mixtures thereof and modified compounds thereof can be used. Preferred examples of the compounds include pyromellitic dianhydride, benzophenonetetracarboxylic dianhydride, cyclopentanetetracarboxylic dianhydride, diphenyl sulfone tetracarboxylic dianhydride and 5-(2,5-dioxotetrahydro-3-furanyl)-3-methyl-3-cyclohexen-1,2-dicarboxylic dianhydride. Among them, pyromellitic dianhydride is more preferred.

The compounds having two or more acid anhydride groups per molecule are used in an amount of preferably 0.05 to 5.0 parts by weight per 100 parts by weight of the thermoplastic polyester resin. When the amount of the compound having two or more acid anhydride groups per molecule is less than 0.05 part by weight per 100 parts by weight of the thermoplastic polyester resin, an effect of improving the viscoelastic properties of the thermoplastic polyester resin during extrusion is not sufficient and good foam cannot be formed, while when the amount exceeds 5.0 parts by weight, the gelation of the molten material of the thermoplastic polyester resin proceeds and extrusion foaming cannot be effected.

Any of inorganic compounds and organic compounds can be used as the compounds of metals of Group I, II or III elements of the Periodic Table, so long as they have these metals as their constituent atoms. Examples of the inorganic compounds include potassium chloride, sodium chloride, sodium hydrogencarbonate, sodium carbonate, potassium carbonate, zinc carbonate, magnesium carbonate, calcium carbonate, aluminum carbonate, sodium oxide, potassium oxide, zinc oxide, magnesium oxide, calcium oxide, aluminum oxide and the hydroxides of these metals. Examples of the organic compounds include sodium stearate, potassium stearate, zinc stearate, magnesium stearate, calcium stearate, aluminum stearate, sodium montanate, calcium montanate, lithium acetate, sodium acetate, zinc acetate, magnesium acetate, calcium acetate, sodium caprylate, zinc caprylate, magnesium caprylate, calcium caprylate, aluminum caprylate, sodium myristate, zinc myristate, magnesium myristate, calcium myristate, aluminum myristate, calcium benzoate, potassium terephthalate, sodium terephthalate, sodium ethoxide and potassium phenoxide. Among them, the compounds of Group I or II metals of the Periodic Table are preferred and the compounds of Group I metals are more preferred. By using the compounds of Group I, II or III metals, the cells of the resulting thermoplastic polyester resin foam are made finer and at the same time, an effect of increasing the viscoelasticity by the compound having two or more acid anhydride groups per molecule can be increased.

The compounds of Group I, II or III metals of the Periodic Table are used in an amount of 0.05 to 5.0 parts by weight per 100 parts by weight of the thermoplastic polyester resin. When the amount of the compound is less than 0.05 part by weight, effects of making the cells of the resulting foam finer and the efficiency of increasing the viscoelasticity by the compound having two or more anhydride groups are not sufficient, while when the amount exceeds 5 parts by weight, the resulting foam is colored and the viscosity of the molten thermoplastic polyester resin is not high enough.

Any of blowing agents can be used in the production of the thermoplastic polyester resin foams of the present invention, so long as they are easily vaporizable liquids or thermally decomposable chemicals. Easy vaporizable blowing agents such as inert gases, saturated aliphatic hydrocarbons, saturated alicyclic hydrocarbons, aromatic hydrocarbons, halogenated hydrocarbons, ethers and ketones are preferred. Examples of these easy vaporizable blowing agents include carbon dioxide, nitrogen, methane, ethane, propane, butane, pentane, hexane, methylpentane, dimethylbutane, methylcyclopropane, cyclopentane, cyclohexane, methylcyclopentane, ethylcyclobutane, 1,1,2-trimethylcyclopropane, trichloromonofluoromethane, dichlorodifluoromethane, monochlorodifluoromethane, trichlorotrifluoroethane, dichlorotetrafluoroethane, dichlorotrifluoroethane, monochlorodifluoroethane, tetrafluoroethane, dimethyl ether, 2-ethoxy, acetone, methyl ethyl ketone, acetylacetone dichlorotetrafluoroethane, monochlcrotetrafluoroethane, dichloromonofluoroethane and difluoroethane.

Usually, the blowing agent is injected into the molten blend of the thermoplastic polyester resin, the compound having two or more acid anhydride groups per molecule and other additives on the way of an extruder. The amount of the blowing agent to be injected is from 0.05 to 50% by weight based on the amount of the molten blend. When the amount of the blowing agent is less than 0.05% by weight, the resulting foam is not sufficiently expanded, while when the amount is more than 50% by weight, the gas of the blowing agent is not accommodated for foaming, but blows off and the foam cannot be formed into a desired shape. The preferred amount of the blowing agent is 0.1 to 30% by weight based on the amount of the molten blend.

In the production of the thermoplastic polyester resin foams of the present invention, stabilizer, expansion nucleating agent, pigment, filler, flame retarder and antistatic agent may be optionally added to the resin blend to improve the physical properties of the thermoplastic polyester resin foams and molded articles thereof.

In the production of the thermoplastic polyester resin foams of the present invention, foaming can be carried out by any of blow molding process and extrusion process using single screw extruder, multiple screw extruder and tandem extruder.

Dies used in the extrusion process or the blow molding process are flat die, circular die and nozzle In the production of the polyester resin foams of the present invention, the thermoplastic polyester resin can be mixed with the compound having two or more acid anhydride groups per molecule and other additives by any of the following methods.

(A) The thermoplastic polyester resin is mixed with the compound having two or more acid anhydride groups per molecule ar a low temperature (e.g., a temperature of not higher than 150° C.). (For example, the powder of the compound having two or more acid anhydride groups per molecule is stuck on the pellet of the thermoplastic polyester resin).

(B) The compound having two or more acid anhydride groups per molecule is previously melt-mixed with a thermoplastic resin, the mixture is pelletized and the pellet is mixed with the thermoplastic polyester resin (this thermoplastic resin may be the same as or different from the thermoplastic polyester resin, but is preferably one compatible with the thermoplastic polyester resin).

(C) The thermoplastic polyester resin is previously fed to an extruder hopper to melt it and the compound having two or more acid anhydride groups per molecule is fed through a feed opening provided at the cylinder of the extruder to effect mixing.

In any of the above mixing methods, the moisture content of the resin blend should be as small as possible and is reduced to preferably not higher than 200 ppm. It is preferred that the thermoplastic polyester resin is dried at room temperature of 60° to 180° C. with hot air having a dew point of not higher than −20° C. in a dehumidifying hot-air dryer for about 4 hours.

The present invention also relates to a process for producing a thermoplastic polyester resin foam, which comprises cooling a high-temperature thermoplastic polyester resin foam immediately after expansion to a temperature of not higher than the glass transition point of the resin to bring the crystallinity to 30% or below and then heating the foam to higher than 60° C.

Pre-expanded (primarily expanded) foam extruded through an extruder has only a low expansion ratio and usually a high density. The expansion ratio varies depending on the shapes of foams, but is about 5 times at most when the extruded foam is a sheet. In the present invention, the thus-obtained pre-expanded foam, while its temperature is high immediately after extrusion, is cooled to a temperature of not higher than the glass transition point of the polyester resin. The glass transition point of the polyester resin varies depending on the types of carboxylic acids and alcohols which constitute polyesters, but is generally in the range of 30° to 90° C. Hence, the foam is generally cooled to a temperature of not higher than 60° C.

When the pre-expanded foam is cooled, it is settled without having a time to crystallize and hence the crystallinity thereof is low. The crystallinity varies depending on the degree of cooled. For example, the crystallinity varies depending on the type and temperature of cooling media and the contact conditions of the foam with the cooling media. When the pre-expanded foam prepared by extrusion is brought into directly contact with water at room temperature, the crystallinity thereof is several % to ten-odd %, generally not higher than 30%. However, when the pre-expanded foam prepared by extrusion is put into a mold to shape it, crystallinity becomes 30% or higher, since the foam is not cooled unless the mold is forcedly cooled. Particularly, the crystallinity of thick-wall pre-expanded foam becomes 30% or higher. Accordingly, when the pre-expanded foam is prepared by means of the extruder, the foam is allowed to proceed along a cooled mild to thereby cool it.

In order to conduct effectively the cooling of the pre-expanded foam, it is desirable that the foam has a large surface area in comparison with its volume. Namely, it is desirable that the foam is in the form of a sheet, if possible and its thickness is not more than 10mm, preferably not more than 3 mm. When the sheet is cylindrical, a mandrel is put into the inside of the cylinder, the sheet is allowed to proceed along the mandrel which is cooled with water and the length of the mandrel should be as long as possible. On the other hand, when the sheet is a flat sheet, the sheet is put between a pair of rollers and allowed to proceed while cooling and at the same time, the rollers are cooled with water and the diameters of rollers should be as large as possible. In this way, the crystallinity of the pre-expanded foam is brought to 30% or below.

The foam is then re-heated to carry out post expansion (secondary expansion). For post expansion, the foam is heated to 60° C. or higher. Any of heating means can be used. For example, heating may be conducted by conduction in contact with a heating plate. Alternatively, heating may be conducted by radiation, convection or high-frequency power. Any of heating media can be used, so long as polyester resins are not deteriorated by them. A preferred heating method is such that the pre-expanded foam is brought into contact with a heated metal or air or with steam or heated water.

The heating time for the post expansion is determined according to the properties of the resins, the shape and the type and temperature of the heating medium. Generally, when the temperature of the heating medium is low, heating time is prolonged, while when the temperature is high, heating time is shortened. Further, when the foam is thick-walled, heating time is prolonged, while when the foam is thin-walled, heating time is shortened.

It is preferred that a metal plate is heated to 60° to 200° C. and the pre-expanded foam is brought into contact with the metal plate for 5 seconds or longer when the foam is heated by bringing it into contact with the metal plate. When the pre-expanded foam is heated by bringing it into contact with air, it is preferred that the foam is put into an oven, the temperature within the oven is elevated to 100° to 230° C. and the foam is heated for 10 seconds to 5 minutes. It is desirable that when the foam is heated by the metal plate or air, the foam is left to stand for at least 24 hours, usually about 3 days after the pre-expansion and then is subjected to the post expansion without conducting post expansion immediately after pre-expansion.

On the other hand, when the pre-expanded foam is heated by bringing it into contact with steam or hot water, post expansion can be carried out immediately after pre-expansion. In this case, the temperature of steam or water is 60° to 125° C. and contact time is 10 seconds to 5 minutes.

Figure 2:
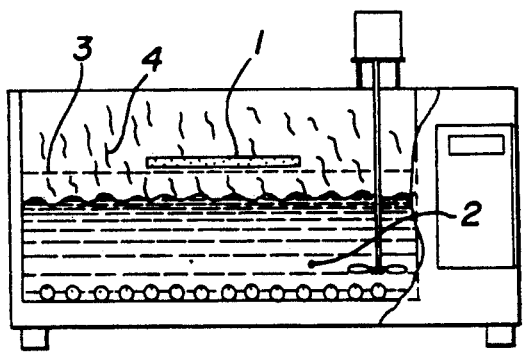
Figure 3:
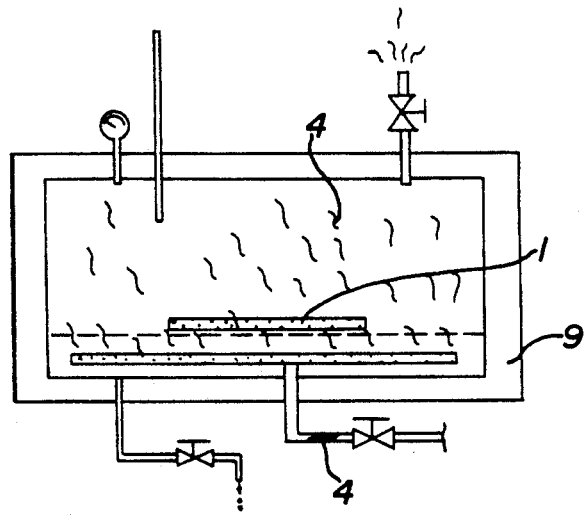

The polyester resin foam can be brought into contact with steam or water by various methods. For example, the foam 1 may be immersed in heated water 2 as shown in FIG. 1. In FIG. 1, a numeral 8 means a burner. In another embodiment, a metal gauze 3 is placed above the surface of heated water and the foam 1 is placed on the metal gauze 3 and is brought into contact with steam 4 which is evaporated from water 2 as shown in FIG. 2. In other embodiment, pressurized steam 4 is blown into a container 9 containing the foam 1 as shown in FIG. 3.

It is preferred that the foam is placed in a mold and molded into a desirable shape when the foam is to be heated by bringing it into contact with water or steam. When a mold is used, water or steam is allowed to introduce into the mold to thereby bring the foam into directly contact with water or steam.

When the polyester resin foam is heated to 60° C. or higher by bringing it into contact with water or steam in the manner described above, the foam is post-expanded to form a foam having a low density. Generally, highly post expansion can be easily conducted by heating with water or steam rather than air. Further, steam is more preferable than water. When heating is conducted with water or steam, the post expansion ratio is at least 1.3 though it is lower than the pre-expansion ratio, and it is possible that the ratio is 4 or more. In addition thereto, expansion can be uniformly carried out and the resulting post-expanded foam has fine, uniform cells. In this way, a low-density foam of good quality can be obtained.

Thus, when the pre-expanded foam is heated, not only a low-density foam can be readily obtained, but the post-expanded foam can be rendered to have a crystallinity of 15% or more. A foam having a crystallinity of 15% or more is a foam which is very excellent in heat resistance in a heating atmosphere and can be used for heat-resistant food containers, heat insulating materials, etc.

Further, the melt viscosity, die swell ratio, etc. of the thermoplastic polyester resins are adjusted in the process of the present invention to produce extrusion foam sheets. The extrusion foam sheets of the thermoplastic polyester resins have a density of preferably not higher than 0.7 g/cm$^3$, more preferably not higher than 0.5 g/cm$^3$. When the density exceeds 0.7 g/m$^3$, heat insulating properties, lightweight properties and cushioning properties as foam sheet are lost. It has been fund that the extrusion foam sheets having a crystallinity of not higher than 20% and a molecular orientation ratio of not higher than 4.5 in the direction of face of foam sheet are preferred from the viewpoint of thermoformability. It is difficult to lower the crystallinity through the thickness, since the extrusion foam sheet immediately after extrusion has heat insulating properties. However, post thermoformability can be improved by lowering the molecular orientation ratio to a specific value or below.

The molecular orientation ratio of the extrusion foam sheet looking the direction from the surface of foam sheet can be adjusted to 4.5 or below by controlling expansion in the direction of extrusion and in the direction crossing the extrusion direction. As a preferred method therefor, there is generally used a method using a circular die and a cylindrical mandrel. Namely, expansion in the direction of extrusion can be controlled by the ratio of the average flow rate of a foamed resin to a take-off speed in the direction of extrusion at the outlet gap of the circular die, and expansion in the direction crossing the extrusion direction can be controlled by the ratio (hereinafter referred to as blow-up ratio) of the diameter of the outlet of the circular die to the outer diameter of the mandrel.

Crystallinity is determined from quantity of heat of cold crystallization and quantity of heat of fusion in heating by heat-flux DSC (differential scanning calorimetry) in the measurement of heat of transition according to JIS-K-71222 (Method for measuring heat of transition of plastics). Namely, crystallinity is determined by the following equation.

$$\text{Crystallinity (\%)} = \frac{\text{(Quantity of heat of fusion per mol)} - \text{(quantity of heat of cold crystallization per mol)}}{\text{Quantity of heat of fusion per mol of perfect crystallized resin}} \times 100$$

Crystallinity was measured by using differential scanning calorimeter DSC 200 manufactured ty Seiko K. K. For the quantity of heat of perfect crystal fusion of polyethylene terephthalate, there was used 26.9 kJ/mol from *Kobunshi Deta Handobukku* (published by Baifukan KK).

Molecular orientation ratio in the direction of face of foam sheet is the ratio between the maximum value of intensity of microwave transmitted through foam sheet and the minimum value thereof when the surface of foam sheet is perpendicularly irradiated with a polarizer (manufactured by Kanzaki Paper Mfg. Co., Ltd.).

Further, food containers can be produced by bonding a non-foam film of a thermoplastic resin to at least one side of the extrusion foam sheet of the thermoplastic polyester resin according to the present invention to form a laminated sheet and thermoforming it into a food container in such a manner that the non-foam sheet is positioned inside.

Examples of the thermoplastic resin which constitutes the non-foam film include thermoplastic polyester resins, liquid crystal polyester resins, polyolefin resins, polyamide resins, polyvinyl chloride resins, polyacrylonitrile resins, polyvinylidene chloride resins and ethylene-vinyl alcohol copolymers.

Non-foam film to be bonded may be composed of a single-layer film or multi-layer film. The non-foam film may be bonded to both sides of the foam sheet. The thickness of the non-foam film layer is 10 to 500 microns and the thickness of the sheet layer of the expanded polyester resin is thicker, i.e., generally not more than 5 mm. It is preferred that the thickness of the foam sheet layer is 2 to 500 times that of the non-foam film layer.

The non-foam film can be laminated onto the foam sheet by using a plurality of extruders. More particularly, a thermoplastic polyester resin is fed to an extruder and an expandable polyester resin is extruded therethrough. Separately, a thermoplastic resin is fed to other extruder and a non-expandable resin is extruded therethrough. These resins are guided to the same one die and combined together in the die to prepare a laminated sheet. In another embodiment, the resins extruded through each extruder are fed to separate dies to prepare a foam sheet and a film respectively. They are put upon each other and pressed through rollers to prepare a laminated sheet.

In a still other embodiment, the foam sheet and the non-foam sheet are separately prepared and separately wound up into rolls. They are laminated onto each other, while unwinding, and passed through a pair of rollers to thereby laminate them. The temperature of the roller on the side of the foam sheet is preferably low, for example, room temperature to prevent polyester resin from being crystallized. On the other hand, the roller on the side of the non-foam film is kept preferably at a high temperature so as to soften the surface of the film.

The laminated sheet is re-heated and thermoformed into a container. The thermoforming is carried out by using a molding die. The die may be composed of a male mold and a female mold, but may be composed of either one of them. When a die composed of both molds is used, molding can be carried out merely by putting the laminated sheet between both molds and pressing it. However, when either one of molds is used, air present between the sheet and the mold is removed, or the sheet is pressurized from the upper side thereof and pressed. The non-foam film is so arranged that the film is positioned inside the container.

The heating temperature at which the sheet is molded into a container :s determined according to the thermoplastic polyester resin constituting the foam sheet and the thermoplastic resin constituting the non-foam film. The expansion ratio of the foam sheet is increased or decreased by the heating temperature. Accordingly, even when a foam sheet having the same thickness is used, a difference in the thickness of the laminated sheet is caused. Further, the crystallinity of the foam sheet is accelerated depending on the heating temperature and the heating time.

If the foam sheet by extrusion, which is composed of a thermoplastic polyester resin, has a crystallinity of 15% or more, it is excellent in heat resistance in a heating atmosphere in air. However, in the case that it is exposed to heated steam of 100° C. or higher, since the film wall thickness of first layer cells on the surface is thin, the first layer cells are re-swollen. Further, in the case that it is used for a food container to heat foodstuffs such as soup and gratin, the first layer cells are re-swollen, whereby juices from the foodstuffs were likely penetrated into the cells. On the other hand, since in the present invention a non-foam film is bonded such that it is positioned inside the container, the re-swelling by heated steam or hot water and the penetration of juices from the foodstuffs into the cells can be prevented.

The following Examples, Comparative Examples and Test Examples are provided to illustrate the present invention, but are not to be construed as limiting the present invention in any way.

TEST EXAMPLE 1

An experiment was carried out to examine the effects of the addition of the compound having two or more acid anhydride groups per molecule to the thermoplastic polyester resin on viscoelastic properties during melting.

(1) Test-1

Polyethylene terephthalate (PET 9902, a product of Eastman Kodak Company) was dried at 160° C. with hot air having a dew point of −30° C. in a dehumidifying dryer for 4 hours. 1 kg of the resulting dried material was mixed with 5 g of pyromellitic dianhydride (a product of Chemische Werke Hüls AG). The blend was fed to the hopper of a single screw extruder (diameter of screw: 40 mm, L/D: 30, manufactured by Sekisui Koki K. K.) equipped with a cylindrical channel die (diameter: 5 mm, L/D: 1.6). The molten blend was extruded through the cylindrical channel die at an extrusion rate of 7 kg/Hr under the following production conditions to carry out molding.

| Production conditions by the single screw extruder | |
|---|---|
| Temperature of feed zone of extruder: | 270° C. |
| Temperature of compression zone of extruder: | 280° C. |
| Temperature of melting zone of extruder: | 270° C. |
| Temperature of die: | 270° C. |
| Number of revolutions of screw of extruder: | 32 rpm |

(2) Test-2 (control)

The extrusion of polyethylene terephthalate was carried out in the same manner as in Test-1 except that pyromellitic dianhydride was omitted.

(3) Test results

Die swell ratio of extrudate and the melt viscosity of the molten resin in the single screw extruder are shown in Table 1.

TABLE 1

Effect of the addition of pyromellitic dianhydride to polyethylene terephthalate on melt viscosity and die swell ratio

| Test No. | Amount of Polyethylene Terephthalate (g) | Amount of Pyromellitic Dianhydride (g) | Die Swell Ratio | Melt Viscosity (poise) |
|---|---|---|---|---|
| 1 | 1000 | 5 | 3.3 | $2.8 \times 10^4$ |
| 2 | 1000 | 0 | 1.2 | $0.8 \times 10^4$ |

(4) Discussion

It is clear from Table 1 that when pyromellitic anhydride is added to polyethylene terephthalate, die swell ratio of extrudate is increased and the melt viscosity of the molten resin in extrusion is also increased.

EXAMPLE 1

10 kg of polyethylene terephthalate (PET 9902, a product of Eastman Kodak Company) was dried in a dehumidifying dryer (160° C. with hot air having a dew point of −30° C.) for 4 hours and then mixed with 20 g of pyromellitic dianhydride (a product of Chemische Werke Hüls AG) and 60 g of talc (expansion nucleating agent) in a tumbling mixer. The mixture was fed to the hopper of a single screw extruder (diameter of screw: 40 mm, L/D: 30, bore of nozzle die: 5 mm) and melt-mixed. Isopentane (blowing agent) was injected into the molten mixture in an amount of 2.2% by weight. The molten mixture was extruded through the nozzle die under following production conditions into air to produce a rod-shaped foam.

| Production conditions with single screw extruder | |
|---|---|
| Temperature of feed zone of extruder: | 273 to 282° C. |
| Temperature of compression zone of extruder: | 280 to 290° C. |
| Temperature of melting zone of extruder: | 271 to 290° C. |
| Temperature of extruder head: | 280 to 290° C. |
| Number of revolutions of screw of extruder: | 32 rpm |
| Extrusion rate: | 7 to 8 kg/hr |

The expansion ratio and diameter of the foam are shown in Table 2.

EXAMPLE 2

The procedure of Example 1 was repeated except that the amount of pyromellitic dianhydride was 30 g and isopentane was injected into the molten mixture in an amount of 2.5% by weight to produce a rod-shaped foam.

The expansion ratio and diameter of the foam are shown in Table 2.

EXAMPLE 3

The procedure of Example 1 was repeated except that the amount of pyromellitic dianhydride was 40 g and isopentane was injected into the molten mixture in an amount of 2.6% by weight to produce a rod-shaped foam.

The expansion ratio and diameter of the foam are shown in Table 2.

COMPARATIVE EXAMPLE 1

Effect (1) of the use of pyromellitic dianhydride

The procedure of Example 1 was repeated except that pyromellitic dianhydride was omitted and isopentane was injected into the molten mixture in an amount of 2.7% by weight to produce a rod-shaped foam.

The expansion ratio and diameter of the foam are shown in Table 2.

COMPARATIVE EXAMPLE 2

Effect (2) of the use of pyromellitic dianhydride

The procedure of Example 1 was repeated except that 50 g of phthalic dianhydride was used in place of 20 g of pyromellitic dianhydride and isopentane was injected into the molten mixture in an amount of 2.7% by weight to produce a rod-shaped foam.

The expansion ratio and diameter of the foam are shown in Table 2.

TABLE 2

Effect of use of pyromellitic dianhydride

| Example No. | Amount of Pyromellitic Dianhydride (g) | Amount of Isopentane (%) | Rod-shaped Foam Density (g/cm³) | Expansion Ratio (times) | Diameter (mm) |
| --- | --- | --- | --- | --- | --- |
| Example 1 | 20 | 2.2 | 0.35 | 4.0 | 21 |
| Example 2 | 30 | 2.5 | 0.18 | 7.8 | 27 |
| Example 3 | 40 | 2.6 | 0.13 | 10.8 | 30 |
| Comp. Ex. 1 | — | 2.7 | 0.76 | 1.8 | 9 |
| Comp. Ex. 2 | — | 2.7 | 0.70 | 2.0 | 11 |

Discussion

It is clear from Table 2 that in Examples 1 to 3 wherein pyromellitic dianhydride is used, expansion ratios are 4 to 10, the diameters of the rod-shaped foams are increased to 4 to 6 times the size of the nozzle die and the increasing ratio thereof is in proportion to the increase in the amount of isopentane injected.

In Comparative Examples 1 and 2 wherein pyromellitic anhydride is omitted, expansion ratios are about 2, though isopentane (blowing agent) is used in an amount larger than that in Examples 1 to 3, and the diameters of the rod-shaped foams are about twice as large as the bore of the nozzle die. Accordingly, both the expansion ratio and the diameter are smaller than those of Examples 1 to 3.

These effects are thought to be due to the fact that when pyromellitic dianhydride is not used, the blowing agent isopentane is released from the foam in expansion molding, while when pyromellitic dianhydride is used in expansion molding, the melt viscosity of the thermoplastic polyester is increased, whereby gaseous isopentane (blowing agent) is not allowed to be released from the foam.

EXAMPLE 4

In the procedure of Example 3, the expansion molding operation was continuously carried out for 24 hours. No change for the rod-shaped foam was observed.

EXAMPLE 5

In the procedure of Example 3, the expansion molding operation was carried out for 5 hours and the operation was then stopped for 19 hours. Thereafter, operation and stopping were repeated five times in a 24 hour cycle.

In any case, there could be obtained a rod-shaped foam, which was neither colored nor contaminated within 30 minutes from the commencement of the operation.

COMPARATIVE EXAMPLE 3

In Example 3, diglycidyl terephthalate (Blemmer ®, a product of Nippon Oil & Fats Co., Ltd) was used in place of pyromellitic anhydride and isopentane was injected into the molten mixture in such an amount as to give a 4 g/100 g mixture. In the same manner as in Example 5, the operation was carried out.

In the operation after the third operation, it took 90 minutes or longer until there could be obtained a rod-shaped foam which was neither colored nor contaminated. In the fifth operation, the foam was discolored yellow and contaminated with black matters after 4 hours from re-operation.

EXAMPLE 6

The procedure of Example 1 was repeated except that 50 g of cyclopentanetetracarboxylic acid dianhydride was used in place of 20 g of pyromellitic dianhydride to produce a rod-shaped foam.

The expansion ratio of the foam was 4 and the diameter thereof was 20 mm.

EXAMPLE 7

The procedure of Example 1 was repeated except that 50 g of benzophenonetetracarboxylic acid dianhydride was used in place of 20 g of pyromellitic anhydride to produce a rod-shaped foam.

The expansion ratio of the foam was 4.5 and the diameter thereof was 21 mm.

EXAMPLE 8

In Examples 6 and 7, the operation was carried out in the same manner as in Example 5.

Within 30 minutes from the commencement of the operation, there could be obtained a rod-shaped foam which was neither colored nor contaminated in any case.

EXAMPLES 9 to 17

Polyethylene terephthalate given in Table 3 was dried with hot air having a dew point of $-30°$ C. at 160° C. in a dehumidifying dryer for 4 hours. 100 parts by weight of the dried polyethylene terephthalate, pyromellitic dianhydride in an amount given in Table 3, a metallic compound given in Table 3 and 0.6 part by weight of talc (expansion nucleating agent) were mixed in a tumbling mixer. The mixture was fed to the hopper of a single screw extruder (diameter of screw: 40 mm, L/D: 30) equipped with a nozzle die (bore: 5 mm). 2.0% by weight of n-pentane was injected into the molten mixture. The molten mixture was extruded under the following conditions to obtain a rod-shaped foam.

| | |
| --- | --- |
| Temperature of feed zone of extruder: | 268 to 280° C. |
| Temperature of compression zone of extruder: | 285 to 290° C. |
| Temperature of melting zone of extruder: | 275 to 285° C. |
| Temperature of extruder head: | 275 to 285° C. |
| Temperature of extruder die: | 275 to 285° C. |
| Number of revolutions of screw: | 32 rpm |

The expansion ratios of the foams and the state of cells are shown in Table 3.

Figure 8:
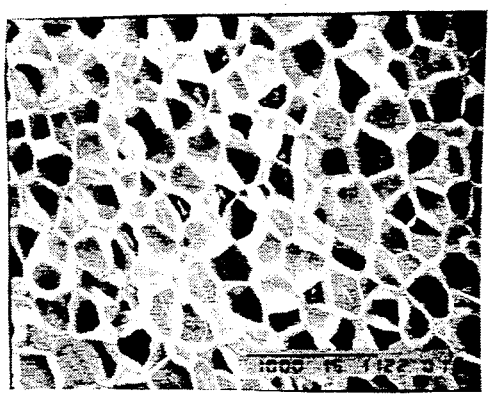
FIGS. 8, 9 and 10 are electron microscopic photographs which show the shapes of cells of the foams papered in Examples 9, 12 and 17, respectively.

FIG. 8 is an electron microscopic photograph showing the state of cells of the foam prepared in Example 9, which is enlarged about 25 times. The cells shown in FIG. 8 were small.

Figure 9:
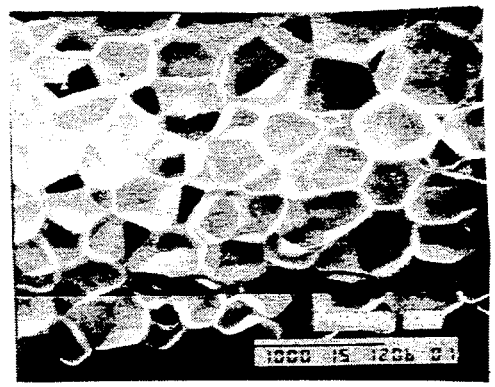
Figure 10:

Further, FIGS. 9 and 10 are electron microscopic photographs showing the states of cells of the foams prepared in Examples 12 and 17, respectively, which are enlarged about 25 times. The cells of the foam prepared in Example 17 were slightly larger than those in Example 12.

COMPARATIVE EXAMPLE 4

The procedure of Example 9 was repeated except that pyromellitic dianhydride and the metallic compound were omitted to produce a rod-shaped foam.

The expansion ratio of the foam and the state of cells are shown in Table 3.

EXAMPLES 18 to 20

The procedure of Example 9 was repeated except that polyester resins, acid anhydrides and metallic compound given in Table 4 were used to obtain foams.

The expansion ratios of the foams and the state of cells are shown in Table 4.

COMPARATIVE EXAMPLE 5

The procedure of Example 9 was repeated except that polyethylene terephthalate and diglycidyl terephthalate given in Table 4 were used and the metallic compound was omitted to obtain a foam.

The expansion ratio of the foam and the state of cells are shown in Table 4.

EXAMPLE 21

Polyethylene terephthalate given in Table 5 was dried with hot air having a dew point of −30° C. at 160° C. in a dehumidifying dryer for 4 hours. 100 parts by weight of the dried polyethylene terephthalate, 0.5 part by weight of pyromellitic dianhydride, 0.1 part by weight of sodium carbonate and 0.6 part by weight of talc (expansion nucleating agent) were mixed in a tumbling mixer. The mixture was fed to the hopper of a single screw extruder (diameter of screw: 65 mm, L/D: 35) equipped with a cylindrical mandrel (bore: 205 mm, L/D: 1.5) and a circular die (bore: 60 mm, gap: 0.65 mm), 1.7% by weight of butane was injected into the molten mixture. The molten mixture was extruded through the circular die under the following conditions. The extrudate was taken off by a cylindrical mandrel and molded. A part of the resulting cylindrical foam was cut open and the resulting foam sheet was wound up.

| | |
|---|---|
| Temperature of feed zone of extruder: | 280° C. |
| Temperature of compression zone of extruder: | 290° C. |
| Temperature of melting zone of extruder: | 280° C. |
| Temperature of extruder head: | 280° C. |
| Temperature of extruder die: | 270° C. |
| Injection pressure of blowing agent: | 80 kg/cm² |
| Extrusion pressure (head): | 115 kg/cm² |
| Number of revolutions of screw: | 30 rpm |
| Extrusion rate: | 24 kg/hr |

The expansion ratio of the foam sheet, the state of cells, tensile strength at 23° C. and tensile elongation at break at 23° C. are shown in Table 5.

COMPARATIVE EXAMPLE 6

The procedure of Example 21 was repeated except that diglycidyl terephthalate and sodium montanate in amounts given in Table 5 were used and pyromellitic anhydride and sodium carbonate were omitted. The resulting foam sheet was wound up.

The expansion ratio of the foam sheet, the state of cells, tensile strength at 23° C. and tensile elongation at break at 23° C. are shown in Table 5.

COMPARATIVE EXAMPLE 7

The procedure of Example 21 was repeated except that diglycidyl terephthalate given in Table 5 was used, 0.9% by weight of butane was injected, extrusion was carried out under the following conditions and sodium carbonate was omitted. The resulting foam sheet was wound up.

| | |
|---|---|
| Temperature of feed zone of extruder: | 280° C. |
| Temperature of compression zone of extruder: | 290° C. |
| Temperature of melting zone of extruder: | 280° C. |
| Temperature of extruder head: | 285° C. |
| Temperature of extruder die: | 275° C. |
| Injection pressure of blowing agent: | 40 kg/cm² |
| Extrusion pressure (head): | 90 kg/cm² |
| Number of revolutions of screw: | 25 rpm |
| Extrusion rate: | 24 kg/hr |

The extrusion ratio of the foam sheet, the state of cells, tensile strength at 23° C. and tensile elongation at break at 23° C. are shown in Table 5.

TABLE 3

Expansion ratio of foam and state of cells (Examples 9 to 17, Comparative Example 4)

| Example No. | Polyethylene Terephthalate Trade Name | Amount | Acid Anhydride Compound Name | Amount | Metallic Compound Compound Name | Amount | Foam Expansion Ratio (times) | State of Cells |
|---|---|---|---|---|---|---|---|---|
| Example 9 | PET 9902 | 100 | pyromellitic dianhydride | 0.5 | sodium carbonate | 0.3 | 15 | small |
| Example 10 | PET 9902 | 100 | pyromellitic dianhydride | 0.5 | sodium carbonate | 0.1 | 14 | small |
| Example 11 | PET 9902 | 100 | pyromellitic dianhydride | 0.3 | sodium carbonate | 0.1 | 10 | small |
| Example 12 | PET 9902 | 100 | pyromellitic dianhydride | 0.5 | zinc stearate | 0.1 | 9 | medium |
| Example 13 | PET 9902 | 100 | pyromellitic dianhydride | 0.5 | calcium carbonate | 0.1 | 12 | medium |
| Example 14 | PET 9902 | 100 | pyromellitic dianhydride | 0.5 | aluminum stearate | 0.1 | 9 | medium |
| Example 15 | TR 4550 BH | 100 | pyromellitic dianhydride | 0.5 | sodium carbonate | 0.17 | 14 | small |
| Example 16 | TR 8510 | 100 | pyromellitic dianhydride | 0.25 | " | 0.08 | 14 | small |
| Example 17 | PET 9902 | 100 | pyromellitic dianhydride | 0.3 | — | — | 9 | large |

TABLE 3-continued

Expansion ratio of foam and state of cells (Examples 9 to 17, Comparative Example 4)

| Example No. | Composition of Materials | | | | | | Foam | |
|---|---|---|---|---|---|---|---|---|
| | Polyethylene Terephthalate | | Acid Anhydride | | Metallic Compound | | Expansion Ratio | State |
| | Trade Name | Amount | Compound Name | Amount | Compound Name | Amount | (times) | of Cells |
| Comp. Ex. 4 | PET 10388 | 100 | — | — | — | — | 2 | large |

Note:
PET 9902 and PET 10388 manufactured by Eastman Kodak Company.
TR 4550 BH and TR 8510 manufactured by Teijin Limited.
Sodium carbonate manufactured by Tosoh Corporation.
Pyromellitic dianhydride manufactured by Chemische Werke Huls AG.

TABLE 4

Expansion ratio of foam and state of cells (Examples 18 to 20, Comparative Example 5)

| Example No. | Composition of Materials | | | | | | | | Foam | |
|---|---|---|---|---|---|---|---|---|---|---|
| | Polyester Resin | | Acid Dianhydride | | Epoxy Compound | | Metallic Compound | | Expansion Ratio | State |
| | Trade Name | Amount | Compound Name | Amount | Compound Name | Amount | Compound Name | Amount | (times) | of Cells |
| Example 18 | TR 8580 | 100 | cyclopentane-tetracarboxylic dianhydride | 0.5 | — | — | sodium carbonate | 0.1 | 8 | small |
| Example 19 | TR 8580 | 100 | benzophenone-tetracarboxylic acid dianhydride | 0.5 | — | — | sodium carbonate | 0.17 | 9 | medium |
| Example 20 | XD 478 | 100 | pyromellitic dianhydride | 0.3 | — | — | sodium carbonate | 0.1 | 12 | small |
| Comp. Ex. 5 | TR 8580 | 100 | — | — | diglycidyl terephthalate | 0.5 | — | — | 8 | medium |

Note:
TR 8580 manufactured by Teijin Limited.
XD 478 (MI: 3.0, 235° C.) for polybutylene terephthalate, manufactured by Polyplastic Co., Ltd.
Pyromellitic anhydride manufactured by Huels Japan Limited.
Sodium carbonate manufactured by Tosoh Corporation.

TABLE 5

Expansion ratio of foam, state of cells and tensile strength (Example 21, Comparative Examples 6 and 7)

| Example No. | Composition of Materials | | | | | | Foam Sheet | | | |
|---|---|---|---|---|---|---|---|---|---|---|
| | Polyethylene Terephthalate | | Pyromellitic Dianhydride | Diglycidyl Terephthalate | Sodium Montanate | Sodium Carbonate | Expansion Ratio | State of | Tensile Strength at 23° C. | Tensile Elongation at Break at 23° C. |
| | Trade Name | Amount | (amount) | (amount) | (amount) | (amount) | (times) | Cells | (kg/cm$^2$) | (%) |
| Example 21 | PET 9902 | 100 | 0.5 | — | — | 0.1 | 6 | medium | 63.6 | 116.6 |
| Comp. Ex. 6 | PET 10388 | 100 | — | 0.3 | 0.1 | — | 6 | medium | 39.3 | 64.3 |
| Comp. Ex. 7 | TR 8580 | 100 | 0.2 | 0.6 | — | — | 3 | medium | 81.5 | 53.3 |

Note:
PET 9902 and PET 10388 manufactured by Eastman Kodak Company.
TR 8580 manufactured by Teijin Limited.
Pyromellitic dianhydride by Chemische Werke Huls AG.
Diglycidyl terephthalate: Blemmer ® DGT manufactured by Nippon Oil & Fats Co., Ltd.
Sodium carbonate manufactured by Tosoh Corporation.

TEST EXAMPLE 2

Test Sample: Foam sheets prepared in Examples 21 and Comparative Example 6.

Test method: Dynamic visco-elastometer (manufactured by Toyo Seiki Seisakusho, Ltd.) was used. Complex elastic modulus of test samples [5 mm (width) × 21 mm length) × 1.5 mm (thickness)] was measured under the following conditions.

| Frequency for measurement: | 10 Hz |
|---|---|
| Heating rate: | 3° C./min |
| Distance between clamps: | 15 mm |

Figure 5:
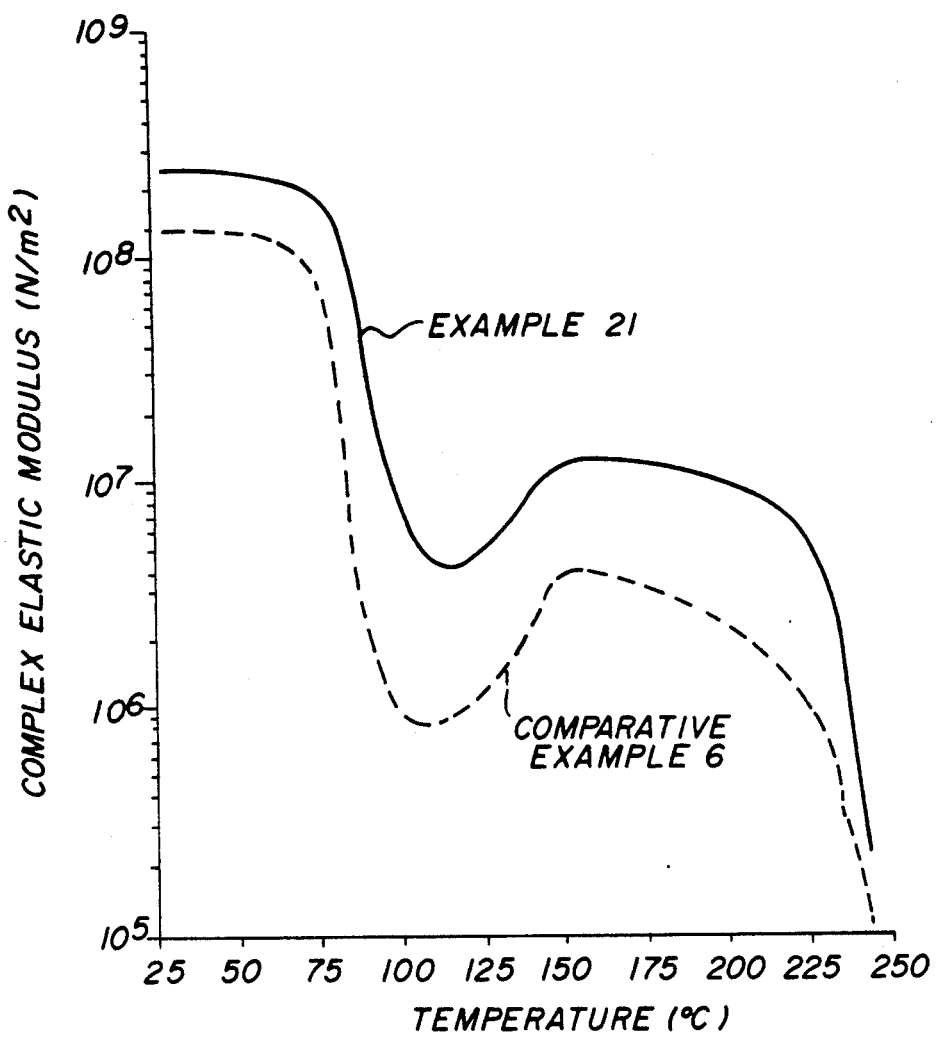
FIG. 5 is a graph illustrating the results of Test Example 2.

The results are shown in FIG. 5.

Discussion

Complex elastic modulus of the foam sheet of Example 21 is higher than that of the foam sheet of Comparative Example 6. Hence, it can be understood that the heat resistance of the foam sheet obtained by using pyromellitic dianhydride and sodium carbonate is high.

The process for producing the thermoplastic polyester resin foam by re-heating is illustrated by means of the following Examples and Comparative Examples. Parts and percent given below are by weight unless otherwise stated.

EXAMPLE 22

Pre-expansion (primary expansion)

TR8580 (trade name, a product of Teijin Limited) as used as polyethylene terephthalate (hereinafter referred to as PET).

PET was placed in a dehumidifying dryer and dried at 160° C. for 4 hours while circulating hot air having a dew point of −30° C. 100 parts of PET, 0.6 part of talc, 0.35 part of pyromellitic dianhydride and 0.1 part of sodium carbonate were thoroughly mixed in a tumbling mixer. The mixture was fed to an extruder (diameter of screw: 65 mm, L/D: 35) and thoroughly mixed at a screw revolution number of 25 rpm and at a barrel temperature of 270° to 290° C. 1.3 parts of butane as a blowing agent per 100 parts of the mixture was introduced into the mixture under pressure on the way of the barrel. PET containing the blowing agent was extruded through the circular die into air to produce a tube. The die has a circular die gap of 0.4 mm and a bore of 60 mm and was kept at 270° to 285° C. PET extruded into air was expanded and the tube as extruded was taken off while bringing it into contact with the outer surface of a cylindrical mandrel. The mandrel had an outer diameter of 205 mm and cooling water at 30° C. was circulated inside the mandrel so that the PET foam was quenched. The quenched PET foam was cut open and the resulting flat foam sheet was wound up and referred to as pre-expanded foam sheet (primarily expanded foam sheet). The foam sheet was 643 mm in width and had an apparent density (hereinafter referred to simply as density) of 0.26 g/cm$^3$, a thickness of 1.5 mm and a crystallinity of 9%.

Post-expansion (secondary expansion)

A piece of 100 mm×100 mm was cut off from the above pre-expanded foam sheet and subjected to post-expansion. The post expansion was carried out by immersing the piece in warm water at 63° C. for 5 minutes as shown in FIG. 1. The thickness was expanded from 1.5 mm to 2.1 mm The ratio $V_2/V_1$ of the volume ($V_2$) of the post-expanded foam sheet to the volume ($V_1$) of the pre-expanded foam sheet was 1.37. The post-expanded foam sheet had a density of 0.19 g/cm$^3$ and a crystallinity of 9%. The post-expanded foam sheet was finely expanded and found to be a good foam.

EXAMPLE 23

The same pre-expanded foam sheet as that obtained in Example 22 was used and post expansion was carried in the same way as in Example 22 except that the temperature of warm water was 83° C. and immersion was conducted for 5 minutes.

There was obtained a post-expanded foam sheet which had a thickness of 3.02 mm, a density of 0.13 g/cm$^3$ and a crystallinity of 10%. The ratio $V_2/V_1$ was 2.00. The foam sheet was finely, uniformly expanded, had a low density and was found to be a good foam.

EXAMPLE 24

The same pre-expanded foam sheet as that obtained in Example 22 was used and post expansion was carried out by bringing the sheet into contact with team as shown in FIG. 2. Namely, post expansion was carried out by bringing the sheet into contact with steam at 62° C. for 5 minutes.

There was obtained a post-expanded foam sheet which had a thickness of 2.51 mm and a density of 0.16 g/cm$^3$. The ratio $V_2/V_1$ was 1.63.

EXAMPLE 25

The procedure of Example 24 was repeated except that the temperature of steam for post expansion was 75° C.

There was obtained a post-expanded foam sheet which had a thickness of 2.73 mm and a density of 0.14 g/cm$^3$. The ratio $V_2/V_1$ was 1.86.

EXAMPLE 26

The procedure of Example 24 was repeated except that the temperature of steam was 100° C. and the contact time was 0.5 minute in the post expansion.

There was obtained a post-expanded foam sheet which had a thickness of 2.78 mm, a density of 0.14 g/cm$^3$ and a crystallinity of 10%. The ratio $V_2/V_1$ was 1.86.

EXAMPLE 27

The procedure of Example 26 was repeated except that post expansion was carried out by bringing the sheet into contact with steam at 100° C. for 2 minutes as shown in FIG. 2.

There was obtained a post-expanded foam sheet which had a thickness of 3.92 mm, a density of 0.10 g/cm$^3$ and a crystallinity of 16%. The ratio $V_2/V_1$ was 2.60.

EXAMPLE 28

The procedure of Example 26 was repeated except that post expansion was carried out by bringing the sheet into contact with steam at 100° C. for 5 minutes.

There was obtained a post-expanded foam sheet which had a thickness of 5.63 mm, a density of 0.065 g/cm$^3$ and a crystallinity of 26%. The ratio $V_2/V_1$ was 3.77.

EXAMPLE 29

The procedure of Example 26 was repeated except that post expansion was carried out by bringing the sheet into contact with steam at 100° C. for 7 minutes.

There was obtained a post-expanded foam sheet which had a thickness of 5.96 mm and a density of 0.065 g/cm$^3$ The ratio $V_2/V_1$ was 4.00.

EXAMPLE 30

Post expansion was carried out in the same manner as in Example 29 by bringing the sheet into contact with steam at 100° C. for 7 minutes except that post expansion was carried out by placing a pre-expanded foam of 200 mm×280 mm in an aluminum mold of 210 mm×mm×5 mm.

There was obtained a post-expanded foam sheet which had a thickness of 5.00 mm and a density of 0.078 g/cm$^3$ The ratio $V_2/V_1$ was 3.33. The sheet obtained was a flat foam sheet.

EXAMPLE 31

The same pre-expanded foam sheet as that obtained in Example 22 was used and post expansion was carried out by blowing pressurized steam as shown in FIG. 3. Namely, post expansion was carried by bringing the sheet into contact with steam at 110° C. for 3 minutes.

There was obtained a post-expanded foam sheet which had a thickness of 3.41 mm and a density of 0.11 g/cm$^3$. The ratio $V_2/V_1$ was 2.36.

EXAMPLE 32

The procedure of Example 31 was repeated except that post expansion was carried out by bringing the sheet into contact with steam at 120° C. for 0.5 minute.

There was obtained a post-expanded foam sheet which had a thickness of 3.00 mm and a density of 0.13 g/cm$^3$. The ratio $V_2/V_1$ was 2.00.

EXAMPLE 33

Pre-expansion was carried out in the same manner as in Example 22 except that carbon dioxide was used as the blowing agent in place of butane and the amount of carbon dioxide was 1.1 parts. The resulting pre-expanded foam sheet was 643 mm in width and had a density of 0.26 g/cm3, a thickness of 1.5 mm and a crystallinity of 9%.

Post expansion was carried out in the same manner as in Example 28 to obtain a post-expanded foam sheet which had a thickness of 3.00 mm and a density of 0.13 g/cm$^3$. The ratio $V_2/V_1$ was 2.00.

EXAMPLE 34

The procedure of Example 22 was repeated except that post expansion was carried out by using hot air at 80° C. in place of warm water at 63° C. and bringing the sheet into contact with hot air for 5 minutes to obtain post-expanded foam sheet.

The post-expanded foam sheet was 2.1 mm in thickness and had a density of 0.19 g/cm$^3$ and a crystallinity of 10%. The ratio $V_2/V_1$ was 1.37.

EXAMPLE 35

The procedure of Example 34 was repeated except that the temperature of hot air in the post expansion was 100° C. to obtain a post-expanded foam sheet.

The post-expanded foam sheet had a thickness of 2.6 mm, a density of 0.15 g/cm$^3$ and a crystallinity of 10%. The ratio $V_2/V_1$ was 1.73.

EXAMPLE 36

The procedure of Example 34 was repeated except hat the temperature of hot air in the post expansion was 110° C. to obtain a post-expanded foam sheet.

The post-expanded foam sheet had a thickness of 2.8 mm, a density of 0.14 g/cm$^3$ and a crystallinity of 12%. The ratio $V_2/V_1$ was 1.86.

EXAMPLE 37

The procedure of Example 34 was repeated except that the temperature of hot air in the post expansion was 140° C. to obtain a post-expanded foam sheet.

The post-expanded foam sheet had a thickness of 3.01 mm, a density of 0.13 g/cm$^3$ and a crystallinity of 25%. The ratio $V_2/V_1$ was 2.00.

EXAMPLE 38

The procedure of Example 34 was repeated except that the temperature of hot air in the post expansion was 230° C. to obtain a post-expanded foam sheet.

The post-expanded foam sheet had a thickness of 4.04 mm, a density of 0.097 g/cm$^3$ and a crystallinity of 26%. The ratio $V_2/V_1$ was 2.68.

EXAMPLE 39

Pre-expansion

Pre-expansion was carried out in the same manner as in Example 22 except that the die provided at the extruder head was changed from the circular die to a flat die and a flat plate was used in place of the mandrel. The flat die had a straight line-form extrusion opening having a width of 150 mm and a gap of 0.7 mm. The flat plate was an aluminum plate of 500×500 mm which was cooled with water at 30° C. The foam sheet was extruded between the aluminum plates, whereby the extruded foam sheet was quenched. In this way, a pre-expanded foam sheet was obtained. The foam sheet had a width of 200 mm, a thickness of 5 mm, a density of 0.52 g/cm$^3$ and a crystallinity of 12%.

Post expansion

Post expansion was carried out in the same manner as in Example 29 by bringing the above pre-expanded foam sheet into contact with steam at 100° C. for minutes. There was obtained a post-expanded foam sheet which had a thickness of 12.5 mm and a density of 0.204 g/cm$^3$. The ratio $V_2/V_1$ was 2.55.

EXAMPLE 40

Pre-expansion was carried out in the same manner as in Example 39 except that the temperature of the aluminum plates was slightly elevated and the cooling rate of the foam sheet was slightly smaller than that in Example 39 to obtain a pre-expanded foam sheet. The width, thickness and density of the foam sheet were the same as those of the sheet of Example 39. However, the crystallinity was 25%.

Post expansion

Post expansion was carried out in the same manner as in Example 39 to obtain a post-expanded foam sheet which had a thickness of 11.0 mm and a density of 0.232 g/cm$^3$. The ratio $V_2/V_1$ was 2.44.

COMPARATIVE EXAMPLE 8

The procedure of Example 22 was repeated except that post expansion was carried out by using hot air at 60° C. in place of warm water at 63° C. and bringing the sheet into contact with hot air for 5 minutes to obtain a post-expanded foam sheet.

The post-expanded foam sheet had a thickness of 1.5 mm and a density of 0.26 g/cm$^3$. The ratio $V_2/V_1$ was 1.00. Accordingly, the post expansion did substantially not take place.

COMPARATIVE EXAMPLE 9

The procedure of Example 22 was repeated except that the temperature of water in the post expansion was lowered to 53° C. to obtain a post-expanded foam sheet.

The post-expanded foam sheet had a thickness of 1.5 mm and a density of 0.26 g/cm$^3$. The ratio $V_2/V_1$ was 1.00 as in Comparative Example 8. Accordingly, the post expansion did substantially not take place.

COMPARATIVE EXAMPLE 10

The procedure of Example 24 was repeated except that the temperature of steam in the post expansion was lowered to 58° C. to obtain a post-expanded foam sheet.

The post-expanded foam sheet had a thickness of 1.5 mm and a density of 0.26 g/cm$^3$. The ratio $V_2/V_1$ was 1.00. Accordingly, the post expansion did substantially take place.

COMPARATIVE EXAMPLE 11

Pre-expansion was carried out in the same manner as in Example 40 except that the temperature of the aluminum plates was elevated to a temperature higher than that of Example 40 and the cooling rate of the extruded sheet was smaller than that of Example 40 to obtain a pre-expanded foam sheet. The width, thickness and density of the foam sheet were the same as those of the foam sheet of Example 40, but the crystallinity thereof was 32%.

Post expansion was carried out by bringing the Pre-expanded foam sheet into contact with steam at 100° C. for 7 minutes to obtain a post-expanded foam sheet which had a thickness of 5 mm and a density of 0.52 g/cm$^3$. The ratio $V_2/V_1$ was 1.00. Accordingly, the post expansion did substantially not take place.

EXAMPLE 41

Figure 4:
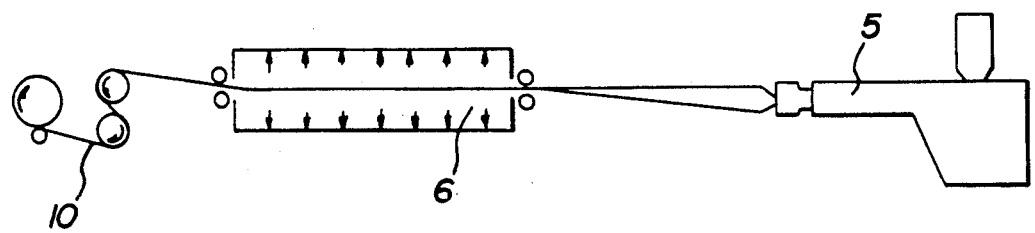
FIG. 4 shows diagrammatically one embodiment of a means for continuously carrying out re-heating according to the present invention.

In this Example, the pre expansion and the post expansion were continuously carried out as shown in FIG. 4. In FIG. 4, an extruder 5 worked in the same manner as in the pre-expansion of Example 22 and continuously delivered a pre-expanded foam sheet. Without winding up the pre-expanded foam sheet, the sheet was successively introduced into a steam tank 6. The temperature of the surface of the sheet was lowered to 30° C. before it was introduced into the steam tank 6. In FIG. 4, a numeral 10 means a winding machine.

The pre-expanded foam sheet was brought into contact with steam at 100° C. in the steam tank 6 for 5 minutes to carry out post expansion. The sheet was then cooled.

The resulting post-expanded foam sheet had a width of 645 mm, a density of 0.07 g/cm$^3$ and a thickness of 5.5 mm and was a low-density fine sheet which was expanded at a high expansion ratio and had fine, uniform cells.

EXAMPLE 42

100 parts of polyethylene terephthalate pellets (trade name: TR8580, manufactured by Teijin Limited) was dried with hot air having a dew point of $-20°$ C. at 160° C. for 5 hours. 0.3 part of pyromellitic dianhydride, 0.1 part of sodium carbonate and 0.6 part of talc as an expansion nucleating agent were uniformly mixed with the pellets in a tumbling mixer. The mixture was fed to the hopper of an extruder (screw diameter: 65 mm, L/D: 35).

Cylinder temperature was 265° to 290° C., the temperature of the extruder head was 265° C., die temperature was 265° C. and number of revolutions of screw was 25 rpm. 2.4% by weight of butane as a blowing agent was introduced into the mixture under pressure on the way of the cylinder.

Die used was a circular die having a diameter of 60 mm and a circular die gap of 0.45 mm. A tube was extruded through the port of the die into air and molded into a cylindrical form by means of a cylindrical mandrel while expanding the molten resin and taking off the tube. Part of the resulting cylindrical foam was cut open and the resulting sheet was wound up In this case, surface temperature was kept at 20° C. while circulating cooling water in the cylindrical mandrel.

The resulting foam sheet had a density (D1) of 0.225 g/cm$^3$, a width of 640 mm and a thickness of 1.6 mm. The sheet had a crystallinity of 9.7% and a glass transition temperature of 75° C.

A re-heating treatment was carried out by contacting the sheet with heating for 30 seconds by using a hot plate having a surface temperature of 160° C. There was obtained a post-expanded foam sheet having a density (D2) of 0.133 g/cm$^3$ and a thickness of 2.7 mm. The ratio of D1/D2 by the heat treatment was 1.69. The crystallinity of the sheet was 24.3%. A sample of 100×100 mm was cut off from the sheet and heated at 200° C. in a constant temperature bath for 30 minutes. The ratio $V_a/V_b$ of the volume ($V_a$) after heating to the volume ($V_b$) before heating was 1.02. It was found that the sheet was excellent in heat resistance.

EXAMPLE 43

100 parts of polyethylene terephthalate pellets (trade name: PET10388, manufactured by Eastman Kodak Company) was dried with hot air having a dew point of $-20°$ C. at 160° C. The dried pellets, 0.25 part of diglycidyl terephthalate (Blemmer ® DGT manufactured by Nippon Oil & Fats Co., Ltd.), 0.1 part of sodium montanate and 0.6 part of talc as an expansion nucleating agent were uniformly mixed in a tumbling mixer. The mixture was fed to the hopper of the same extruder as that used in Example 42.

The cylinder temperature was 280° to 290° C., the temperature of the extruder head was 290° C., the die temperature was 290° C. and the number of revolutions of screw was 25 rpm. 2.2% by weight of pentane as a blowing agent was pressure-fed to the mixture on the way of the cylinder.

The resulting foam sheet had a density (D1) of 0.242 g/cm$^3$, a width of 640 mm and a thickness of 17 mm. The crystallinity of the sheet was 10.6% and the glass transition temperature thereof was 76° C.

A re-heating treatment was carried out by contacting the sheet with heating for 30 seconds by using a hot plate having a surface temperature of 160° C. The resulting sheet had a density (D2) of 0.147 g/cm$^3$ and a thickness of 2.8 mm. The ratio D1/D2 by the heat treatment was 1 65. The crystallinity of the post-expanded foam sheet was 24.4%. A sample of 100×100 mm as cut off from the sheet and heated at 200° C. in a constant temperature bath for 30 minutes. The ratio $V_2/V_1$ was 1.02.

EXAMPLE 44

The extruded foam sheet obtained in Example 42 was contacted with heating for 6 seconds by using a hot plate having a surface temperature of 170° C. to obtain a foam sheet having a density (D2) of 0.106 g/cm$^3$ and a thickness of 3 4 mm. The ratio of D1/D2 by the heat treatment was 2.12. The crystallinity of the post-expanded foam sheet was 16.7%.

A sample of 100×100 mm was cut off from the sheet and heated at 200° C. in a constant temperature bath for 30 minutes. The ratio $V_a/V_b$ was 1.06.

EXAMPLE 45

The extruded foam sheet obtained in Example 42 was heated with steam having a vapor pressure of 4 atm for 30 seconds to obtain a foam sheet having a density (D2) of 0.157 g/cm$^3$ and a thickness of 2.3 mm. The ratio D1/D2 by this heating was 1.43. The crystallinity of the post-expanded foam sheet was 24.3%.

A sample of 100×100 mm was cut off from the sheet and heated at 200° C. in a constant temperature bath for 30 minutes. The ratio $V_2/V_1$ was 0.99.

COMPARATIVE EXAMPLE 12

A sample of 100×100 mm was cut off from the foam sheet which was extruded in Example 42. The crystallinity was 9.7%. The sample was heated at 200° C. in a constant temperature bath for 30 minutes. The ratio $V_a/V_b$ was 1.74. Heat treatment after extrusion was not made. Hence, the sheet was poor in heat resistance and greatly deformed.

COMPARATIVE EXAMPLE 13

The extruded foam sheet obtained in Example 42 was heated with a hot plate having a surface temperature of 140° C. for 10 seconds to obtain a post-expanded foam sheet. The crystallinity was 13.1%. The sheet had a density of 0.114 g/mol and a thickness of 3.15 mm. The ratio D1/D2 by this heating was 1.97.

A sample of 100×100 mm was cut off from the sheet and heated at 200° C. in a constant temperature bath for 30 minutes. The ratio $V_a/V_b$ was 1.11.

The results of Examples 42 to 45 and Comparative Examples 12 and 13 are shown in Tables 6 and 7.

TABLE 6

|  | Foam Sheet | | Post-Expanded Form Sheet | | |
| --- | --- | --- | --- | --- | --- |
|  | Density D1 (g/cm³) | Crystallinity (%) | Density D2 (g/cm³) | Crystallinity (%) | D1/D2 |
| Example 42 | 0.225 | 9.7 | 0.133 | 24.3 | 1.69 |
| Example 43 | 0.242 | 10.6 | 0.147 | 24.4 | 1.65 |
| Example 44 | 0.225 | 9.7 | 0.106 | 16.7 | 2.12 |
| Example 45 | " | " | 0.157 | 24.3 | 1.43 |
| Comp. Ex. 12 | " | " | — | — | — |
| Comp. Ex. 13 | " | " | 0.114 | 13.1 | 1.97 |

TABLE 7

|  | Foam Sheet (mm) | | | Post-Expanded Foam Sheet (mm) | | | |
| --- | --- | --- | --- | --- | --- | --- | --- |
|  | MD | TD | Thickness | MD | TD | Thickness | V2/V1 |
| Example 42 | 100 | 100 | 2.70 | 99.8 | 100.4 | 2.75 | 1.02 |
| Example 43 | 100 | 100 | 2.80 | 99.9 | 100.3 | 2.85 | 1.02 |
| Example 44 | 100 | 100 | 3.40 | 99.7 | 100.2 | 3.60 | 1.06 |
| Example 45 | 100 | 100 | 2.30 | 99.5 | 99.5 | 2.30 | 0.99 |
| Comp. Ex. 12 | 100 | 100 | 1.60 | 97.0 | 94.0 | 3.05 | 1.74 |
| Comp. Ex. 13 | 100 | 100 | 3.15 | 99.4 | 99.4 | 3.55 | 1.11 |

MD: Direction of extrusion of foam sheet
TD: Direction perpendicular to MD

It is clear from Tables 6 and 7 that the volumes of the sheets which were not heat-treated are greatly changed and the sheets are poor in heat resistance. Further, even when the sheets were heat-treated, the sheet having a crystallinity of less than 15% are inferior in heat resistance.

The following Examples 46 to 49 and Comparative Examples 14 to 16 illustrates the extrusion foam sheets of thermoplastic polyester resins and the thermoformability thereof.

EXAMPLES 46 TO 49 AND COMPARATIVE EXAMPLES 14 TO 16

The production unit of extrusion foam sheets, which was used in these examples and comparative examples was a single screw extruder (screw diameter: 65 mm, L/D: 35). The extrusion die was a circular die (bore: 60 mm), and the circular die gap of the extrusion die was changed as shown in Table 9.

The cylindrical mandrel was a water cooled mandrel (outer diameter 205 mm, L/D: 1.5).

In the compositions of extrusion foam sheets used in these examples and comparative examples, 100 parts by weight of polyethylene terephthalate (PET) was used as the thermoplastic polyester resin. The resin grade was changed as shown in Table 8. 0.6 part by weight of talc was used as the expansion nucleating agent per 100 parts by weight of PET. Melt property modifiers and metallic compounds used together with the modifiers were changed as shown in Table 3. Liquefied butane was used as the blowing agent in an amount given in Table 8.

Extrusion foam sheets used in Examples 46 to 49 and Comparative Examples 14 to 16 were produced in the following manner.

Polyethylene terephthalate was dried in a dehumidifying drier (160° C., dew point of −30° C.) for 4 hours. Predetermined amounts of polyethylene terephthalate, modifier, metallic compound and talc were mixed in a tumbling mixer. The mixture was fed to the extruder hopper and melt-mixed. Liquefied butane as the blowing agent was injected into the mixture on the way of the extruder. The mixture was extruded through the circular bore of the circular die into air in the form of a tube. The extrudate was taken while expanding the molten resin, and the foam was cooled by bringing it into contact with the outer surface of the cylindrical mandrel to shape it into a cylinder. Part of the cylindrical foam was cut open and wound up as the foam sheet.

The manufacturing conditions of the extrusion foam sheets used in these examples and comparative examples were as follows.

Temperature of feed zone of extruder: 275° to 285° C., temperature of compression zone of extruder: 285° to 295° C., temperature of melting zone of extruder: 265° to 285° C., temperature of extruder head: 265° to 285° C. temperature of circular die: 260° to 285° C. injection pressure of blowing agent: 40 to 140 kg/cm³, and extrusion pressure (head pressure): 50 to 120 kg/cm³. The number of revolutions of screw and take-off speed are shown in Table 9.

The resulting foam sheets were 640 to 643 mm in width. The apparent density, thickness, crystallinity and molecular orientation ratio thereof are shown in Table 10.

The post thermoformer and thermoforming conditions of the extrusion foam sheets which were used for evaluation in these examples and comparative examples, were as follows.

The post thermoformer was a one-shot molding machine for expanded polystyrene, which had a heating zone with infrared radiation and a press part with air cylinder. The molding tool was a plag-assist press tool (bore: 180 mm×155 mm, depth: 95 mm) for container. Molding conditions were such that 360×360 mm foam sheets were heated at 175° C. in the heating zone for 15 seconds and immediately thereafter, contacted with the thermoformer for 25 seconds to effect the molding.

The resulting molded articles were evaluated by the following criteria.

Appearance

○: The whole of sheet was uniformly extended, could be molded into the same shape as that of press tool and not broken.
Δ: Sheet which could be molded into the same shape as that of press tool, but part of surface was broken and cracks were formed.
x: Sheet which was greatly broken and could not be molded.

Thickness Ratio

The ratio of the thickness of the bottom of the molded article to that of sidewall thereof. The mark "-" shows that the article is greatly broken and measurement cannot be made.

Surface Profile

○: The surface of the molded article was smooth.
Δ: The surface was partly uneven.
x: The surface was considerably uneven

Overall Evaluation

Evaluation was made as a whole by taking all of the surface profile of the extrusion foam sheet and the appearance and thickness of the post thermoformed article into consideration.

⊚: Particularly superior
○: Superior
x: Bad

The results are shown in Table 11.

TABLE 10

|  | Apparent Density (g/cm³) | Thickness (mm) | Crystallinity (%) | Molecular Orientation Ratio |
|---|---|---|---|---|
| Example 46 | 0.19 | 1.5 | 10 | 1.82 |
| Example 47 | 0.18 | 1.7 | 11 | 1.73 |
| Example 48 | 0.16 | 2.6 | 18 | 1.37 |
| Example 49 | 0.63 | 1.2 | 7 | 4.27 |
| Comp. Ex. 14 | 0.19 | 2.0 | 11 | 4.88 |
| Comp. Ex. 15 | 0.23 | 2.0 | 10 | 5.36 |
| Comp. Ex. 16 | 0.18 | 1.7 | 22 | 1.70 |

TABLE 11

|  | Appearance of Molded Article | Thickness Ratio of Molded Article | Surface Profile of Molded Article | Overall Evaluation |
|---|---|---|---|---|
| Example 46 | ○ | 1.2 | ○ | ⊚ |
| Example 47 | ○ | 1.3 | ○ | ⊚ |
| Example 48 | ○ | 1.5 | Δ | ○ |
| Example 49 | ○ | 1.3 | ○ | ○ |
| Comp. Ex. 14 | x | — | ○ | x |
| Comp. Ex. 15 | x | — | Δ | x |
| Comp. Ex. 16 | Δ | 1.5 | x | x |

Molecular orientation of ratio can be adjusted by take-off speed and blow-up ratio, since when the take-off speed of the sheet is increased, the sheet is oriented in the MD direction, while when the blow-up ratio is increased (cooling mandrel diameter is increased), the sheet is orientated in the TD direction. However, when the width and thickness of the sheet and expansion ratio are fixed, molecular orientation ratio cannot be properly adjusted only by the controlling of take-off speed and blow-up ratio. In this case, die temperature is elevated (Example 47, Comparative Example 15).

TABLE 8

|  | Polyethylene Terephthalate | | Modifier | | Metallic Compound | | Amount of Blowing Agent (wt %) |
|---|---|---|---|---|---|---|---|
|  | Manufacturer | Grade | Name | Amount (Part by Weight) | Name | Amount (Part by Weight) |  |
| Example 46 | Eastman Kodak Company | PET 10388 | Pyromellitic anhydride | 0.3 | Sodium carbonate | 0.1 | 1.3 |
| Example 47 | Eastman Kodak Company | " | Pyromellitic anhydride | " | Sodium carbonate | " | " |
| Example 48 | Teijin Limited | TR 4550 BH | Pyromellitic anhydride | 0.5 | Sodium carbonate | " | 1.2 |
| Example 49 | Teijin Limited | TR 8580 | Tetrafunctional epoxy nitride | 0.2 | Omitted | — | 0.7 |
| Comp. Ex. 14 | Teijin Limited | " | Pyromellitic anhydride | 0.5 | Sodium carbonate | 0.1 | 1.3 |
| Comp. Ex. 15 | Teijin Limited | " | Pyromellitic anhydride | 0.3 | Sodium carbonate | " | " |
| Comp. Ex. 16 | Teijin Limited | " | Pyromellitic anhydride | " | Sodium carbonate | " | " |

TABLE 9

|  | Number of Revolutions of Screw of Extruder (rpm) | Die Temp. (°C.) | Circular Die Gap (mm) | Extrusion Rate (kg/Hr) | Take-off Speed (m/min.) | Blow-up Ratio |
|---|---|---|---|---|---|---|
| Example 46 | 25 | 265 | 0.5 | 23.7 | 2.16 | 3.42 |
| Example 47 | " | 280 | 1.0 | 21.4 | 2.18 | 2.63 |
| Example 48 | " | 270 | 0.7 | 23.7 | 2.26 | 3.42 |
| Example 49 | " | 265 | 0.7 | 21.0 | 0.72 | 3.42 |
| Comp. Ex. 14 | " | 280 | 1.0 | 21.4 | 1.45 | 2.63 |
| Comp. Ex. 15 | " | 260 | 1.0 | 22.9 | 1.29 | 2.63 |
| Comp. Ex. 16 | " | 270 | 0.7 | 21.0 | 1.78 | 3.42 |

Molecular orientation ratio can be lowered by reducing the amount of the melt property modifier (Example 47, Comparative Example 14).

Crystallinity can be lowered by lowering the temperature of cooling water for cylindrical mandrel.

Then, a food container of the present invention is illustrated by means of the following examples and comparative examples. Parts given below are by weight unless otherwise stated.

EXAMPLE 50

In this Example, the same thermoplastic polyester resin was used for both foam sheet and non-foam sheet.

100 parts of polyethylene terephthalate pellets (trade name: TR8580 manufactured by Teijin Limited) was used as the polyester resin and dried with hot air having a dew point of $-20°$ C. at 160° C. for 5 hours. 0.3 part of pyromellitic dianhydride, 0.1 part of sodium carbonate and 0.6 part of talc were added thereto. The mixture was uniformly mixed in a tumbling mixer and then fed to an extruder.

The cylinder temperature of the extruder was set to 274° to 287° C. and the die temperature thereof was 277° C. About 1.0% by weight of butane as a blowing agent was pressure-fed to the mixture on the way of the cylinder.

A die having a circular gap was provided at the head of the extruder. The polyester resin containing butane was extruded through the circular gap into a cylindrical shape. The extrudate was allowed to proceed on a cylindrical mandrel, while expanding the resin, to obtain a foam sheet. The cylindrical foam sheet was cut open and the resulting flat sheet was wound up into a roll. The resulting foam sheet had a density of 0.262 g/cm$^3$, a thickness of 1.45 mm and a width of 640 mm.

A polyethylene terephthalate resin film (FFL manufactured by Teijin Limited) of 50 $\mu$ in thickness was used as the non-foam thermoplastic resin film. This film and the above-described sheet were placed upon each other in layers and put between a pair of rollers to laminate them onto each other. The temperature of the roller on the side of the foam sheet was room temperature, while the temperature of the roller on the non-foam sheet was set to 135° C. In this way, there was obtained a laminated sheet in which the non-foam sheet was bonded to only one side of the foam sheet.

A sample having a size of 250×250 mm was cut off from the laminated sheet and preheated by bringing the sample into contact with a hot plate having a surface temperature of 140° C. for 6 seconds. Successively, the preheated sample was put between a male die heated to 180° C. and a female die heated to 180° C. for 6 seconds to thereby mold it into a container and at the same time to accelerate crystallization. Immediately thereafter, the molded article was put between a male die and a female die at room temperature for 6 seconds to cool it, said dies having the same shapes as those of the dies heated 180° C. The molding was conducted in such a manner that the non-foam film layer was positioned inside the container. The resulting container had a shape as shown in FIGS. 6 and 7.

Figure 6:
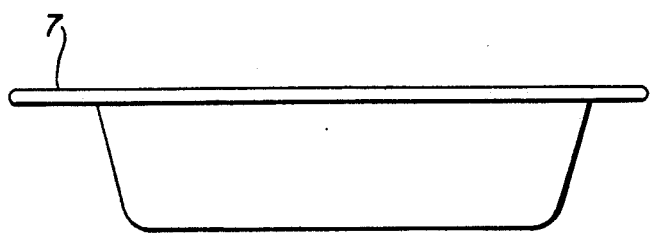
FIG. 6 shows a side view of a food container according to the present invention.
Figure 7:
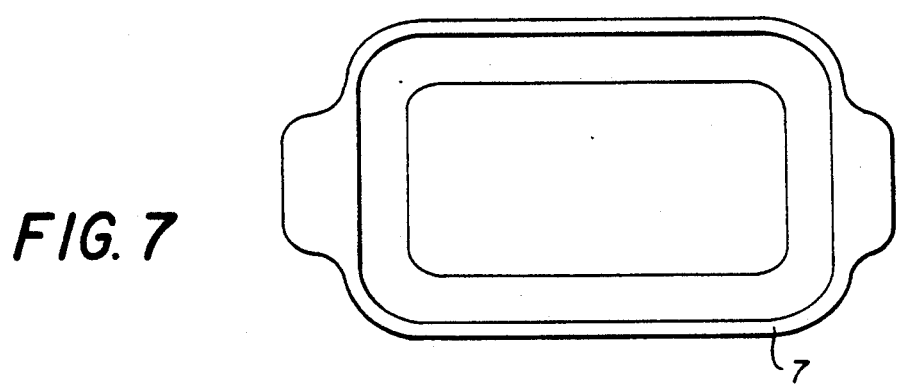
FIG. 7 shows a planar view of a food container according to the present invention.

FIG. 6 shows a side view of the resulting container 7. FIG. 7 shows a plane view of the container 7.

In this molding, the composite sheet increased in expansion ratio and the thickness of the bottom of the container 7 became 3.80 mm.

150 cc of water was put into the container 7 and lid was put thereon. The container was sealed so that water did not leak therefrom. The container was placed in a 500 W microwave oven and heated for 3 minutes to cause water to boil. Immediately after heating, the container could be taken out from the microwave oven with bare hands. The container did not cause any change by the heating. To make sure, the thickness of the bottom of the container was measured. It was found that the thickness of the bottom was 3.95 mm. The container in the heating within the microwave oven increased in thickness only by 4%. Accordingly, it could be considered that no deformation was substantially caused.

EXAMPLE 51

The foam sheet obtained in Example 50 was used, a polypropylene resin film of 100 $\mu$ in thickness was used as the non-foam film and an ethylene-vinyl acetate copolymer resin was used as the adhesive to laminate the films.

One side of the polypropylene resin film was coated with the ethylene-vinyl acetate copolymer resin. The coated side of the film was placed on the polyester resin foam sheet obtained in Example 50. They were passed through a pair of rollers to laminate them. The temperature of the roller on the side of the foam sheet was room temperature, while the temperature of the roller on the side of the non-foam film was 125° C.

A sample of 250×250 mm was cut off from the laminated sheet obtained above and preheated by bringing the foam sheet side into contact with a hot plate having a surface temperature of 140° C. and simultaneously bringing the non-foam film side into contact with a hot plate having a surface temperature of 100° C. for 6 seconds. Successively, the preheated sheet was put between a male die and a female die for 8 seconds in such a manner that the foam sheet side was contacted with the female die heated to 140° C. and the non-foam film side was contacted with the male die heated to 100° C., whereby the composite sheet could be molded into a container which was the same as that of Example 50 and at the same time, crystallization was accelerated. Immediately thereafter, the container was put between two dies at room temperature for 6 seconds to cool it, said two dies having the same shapes as those of the dies heated. The molding was conducted so that the non-foam film was positioned inside the container. The foam sheet was swollen by this molding and the thickness of the bottom of the container became 2.94 mm.

In the same way as in Example 50, water was put into the resulting container. The container was heated in the microwave oven. Immediately after heating, the container could be taken out with bare hands. It was found that no deformation was caused after heating. To make sure, the thickness of the bottom of the container was measured. The bottom was 3.05 mm in thickness. An increase in thickness was only 4%. Accordingly, it could be considered that the container could withstand heating by microwave oven.

EXAMPLE 52

The foam sheet obtained in Example 50 was used and a polyethylene terephthalate resin film of 150 $\mu$ in thickness was used as the non-foam film. They were laminated onto each other without using any adhesive to obtain a composite sheet. The laminating of the film was carried out by using a pair of rollers in which the temperature of the roller on the side of the foam sheet was room temperature and the temperature of the roller on the side of the non-foam film was 155° C.

A sample of 250×250 mm was cut off from the laminated sheet. In the same way as in Example 50, a container was prepared from the sample. The thickness of the bottom of the container was swollen to 4.39 mm.

Water was placed in the container. The container was heated in the microwave oven in the same way as in Example 50. Immediately after heating, the container could be taken out from the oven with bare hands. It was found that the container taken out did not cause any deformation. To make sure, the thickness of the bottom of the container was measured and the thickness was 4.44 mm. Deformation ratio was as small as only 1%.

EXAMPLE 53

The procedure of Example 52 was repeated except that a polybutylene terephthalate resin film of 30 μ in thickness was used in place of the polyethylene terephthalate resin film. The thickness of the bottom of the molded container was 4.20 mm.

After heating, the container could be taken out from the microwave oven with bare hands. It was found that the container taken out was not deformed as compared with that before heating. The thickness of the bottom of the container after heating was measured. The thickness of the bottom was 4.34 mm. The deformation ratio of the thickness was only 3%.

COMPARATIVE EXAMPLE 17

A container was prepared only from the polyester resin foam sheet obtained in Example 50 without laminating the non-foam film onto the foam sheet. Namely, the polyester resin foam sheet obtained in Example 50 was preheated by bringing it into contact with a hot plate heated to 140° C. for 6 seconds. Successively, the preheated sheet was put between a male die heated to 180° C. and a female die heated to 180° C. for 8 seconds, whereby the molding was carried out and at the same time, crystallization was accelerated. Immediately thereafter, the molded article was put between a male die and a female die at room temperature for 6 seconds to cool it, said dies having the same shapes as those of the dies heated to 180° C. In this way, the same container as that of Example 50 was obtained. The thickness of the bottom thereof was 3.39 mm.

In the same way as in Example 50, water was placed in the container and the container was heated in the microwave oven. Immediately after heating, the container could be taken out from the microwave oven with bare hands. The container taken out was highly expanded and recessed parts and protruded parts were formed on the inner surface thereof. The thickness of the bottom of the container after heating was measured. The thickness thereof was 4.04 mm. Namely, this showed an increase of as large as 19% in thickness. Accordingly, it was considered that deformation was large and the container could not withstand heating in the microwave oven.

COMPARATIVE EXAMPLE 18

In this Comparative Example, the foam sheet of polystyrene was used and the non-foam film of the thermoplastic polyester resin was used. They were laminated onto each other by using an ethylene-vinyl acetate copolymer resin to obtain a laminated sheet corresponding to one described in JP-A-62-70037.

Namely, one side of the non-foam polyethylene terephthalate film having a thickness of 50 μ was coated with the copolymer resin. The coated side of the film was placed on the expanded polyethylene sheet having a thickness of 2.4 mm and a base weight of 200 g/m$^2$ to laminate them. The laminating of them was carried out by using a pair of rollers heated to 150° C.

A sample of 250×250 mm was cut off from the laminated sheet and preheated by bringing it into contact with a hot plate heated to 140° C. for 8 seconds. Immediately thereafter, the sheet was put between a male die and a female die at room temperature for 6 seconds to cool it. There was obtained a container having the same shape as that of the container of Example 50. The container was prepared in such a manner that the nonfoam film was positioned inside the container. The thickness of the bottom of the container was increased to 4.2 mm.

In the same way as in Example 50, water was placed in the container, and the container was heated in the microwave oven. Though the container could be taken cut from the microwave oven with bare hands immediately after heating, the container was considerably deformed by heating. Particularly, the expanded polystyrene layer on the outer side of the container was deformed by swelling. As a result, protrusions and recesses were formed on the non-foam film on the inner side of the container. The thickness of the bottom of the container after heating was measured. The thickness of the bottom was 4.88 mm. This showed an increase of 16% in thickness. Hence, it was considered that the container was not suited for use in the microwave oven.

As stated above, the present invention has the following effects.

The foams of the thermoplastic polyester resins are those having fine cells uniformly dispersed therein.

The foams of the present invention are excellent in rigidity and heat resistance, though they are lightweight. Further, the foams have high tensile strength and high tensile elongation at break.

The foams give molded foams having a higher expansion ratio and much fine cells uniformly dispersed therein when re-heated.

The extrusion foam sheets of the present invention are excellent in thermoformability.

Food containers thermoformed can be used in dual ovenable applications.

While the invention has been described in detail and with reference to specific embodiments thereof, it will be apparent to one skilled in the art that various changes and modifications can be made therein without departing from the spirit and scope thereof.

What is claimed is:

1. A process for producing a thermoplastic polyester resin foam comprising melting a thermoplastic polyester resin, mixing the molten resin with a blowing agent and extruding the mixture into a low-pressure zone to carry out foaming, characterized in that a compound having two or more acid anhydride groups per molecule is added to the thermoplastic polyester resin 2. A process for producing a thermoplastic polyester resin foam as in claim 1, wherein said compound having two or more acid anhydride groups per molecule is used in an amount of 0.05 to 5 parts by weight per 100 parts by weight of the thermoplastic polyester resin.

3. A process for producing a thermoplastic polyester resin foam as in claim 1, wherein said compound having two or more acid anhydride groups per molecule is pyromellitic dianhydride, benzophenonetetracarboxylic dianhydride, cyclopentanetetracarboxylic dianhydride, diphenyl sulfone tetracarboxylic dianhydride, or 5-(2,5-dioxotetrahydro-3-furanyl)-3 methyl-3-cyclohexen-1,2-dicarboxylic dianhydride.

4. A process for producing a thermoplastic polyester resin foam as in claim 1, wherein said foam has a density of not higher than 0.7 g/cm$^3$.

5. A process for producing a thermoplastic polyester resin foam as in claim 1, wherein said foam is an extruded foam sheet having a density of not higher than 0.5 g/cm$^3$.

6. A process for producing a thermoplastic polyester resin foam as in claim 1, wherein said thermoplastic polyester resin is polyethylene terephthalate, polybutylene terephthalate, polybutylene terephthalate elastomer, an amorphous polyester, polycyclohexane terephthalate, polyethylene naphthalate or a mixture thereof.

7. A process for producing a thermoplastic polyester resin foam comprising melting a thermoplastic polyester resin, mixing the molten resin with a blowing agent and extruding the mixture into a low-pressure zone to carry out foaming, characterized in that a compound having two or more acid anhydride groups per molecule and a compound of a metal of Group I, II or III elements of the Periodic Table are added to the thermoplastic polyester resin.

8. A process for producing a thermoplastic polyester resin foam as in claim 7, wherein said compound having two or more acid anhydride groups per molecule is used in an amount of 0.05 to 5 parts by weight and said compound of a metal of Group I, II or III elements of the Periodic Table is used in an amount of 0.05 to 5 parts by weight, each amount being per 100 parts by weight of the thermoplastic polyester resin.

9. A process for producing a thermoplastic polyester resin foam as in claim 7, wherein said elements of the Periodic Table.

10. A process for producing a thermoplastic polyester resin foam as in claim 7, wherein said foam has a density of not higher than 0.5 g/cm$^3$.

11. A process for producing a thermoplastic polyester resin foam comprising cooling a high-temperature thermoplastic polyester resin foam immediately after expansion to a temperature of not higher than the glass transition point of the resin to bring crystallinity to 30% or lower and then heating the foam to 60° C. or higher.

12. A process for producing a thermoplastic polyester resin foam as in claim 11, wherein said heating is carried out by bringing the polyester resin foam into contact with steam or hot water.

13. A process for producing a thermoplastic polyester resin foam as in claim 11, wherein said heating is carried out by bringing the polyester resin foam into contact with a hot plate.

14. A process for producing a thermoplastic polyester resin foam as in claim 11, wherein said foam is re-expanded 1.3 times or more by heating.

15. A thermoplastic resin foam sheet characterized by that said sheet is an extruded foam sheet of a thermoplastic polyester resin and has a crystallinity of not higher than 20% and a molecular orientation ratio of 4.5 or lower looking the direction from the surface of the foam sheet.

16. A thermoplastic resin foam sheet as in claim 15, wherein said sheet is an extruded foam sheet produced by using a circular die and a cylindrical mandrel.

17. A thermoplastic resin foam sheet as in claim 15, wherein said sheet is an extruded foam sheet of not more than 5 mm in thickness.

18. A food container produced by laminating a non-foam film of a thermoplastic resin on at least one side of the foam sheet of a thermoplastic polyester resin to obtain a laminated sheet and molding the laminated sheet into a container in such a manner that the non-foam film is positioned inside the container.

19. A food container as in claim 18, wherein said non-foam film is prepared from thermoplastic polyester resins, liquid crystal polyester resins, polyolefin resins, polyamide resins, polyvinyl chloride resins, polyacrylonitrile resins, polyvinylidene chloride resins or ethylene-vinyl alcohol copolymers.

20. A food container as in claim 18, wherein said container is prepared by thermoforming a laminated sheet having a thickness of 0.5 to 5 mm.

21. A food container as in claim 18, wherein the crystallinity of the resin is brought to 15% or above and the density of the foam is brought to not higher than 0.5 g/cm$^3$ by thermoforming the laminated sheet.

* * * * *

REEXAMINATION CERTIFICATE (3326th)
United States Patent [19]
Hayashi et al.

[11] B1 5,000,991
[45] Certificate Issued Sep. 16, 1997

[54] PROCESS FOR PRODUCING POLYESTER RESIN FOAM AND POLYESTER RESIN FOAM SHEET

[75] Inventors: Motoshige Hayashi; Norio Amano; Takeshi Taki; Takaaki Hirai, all of Nara, Japan

[73] Assignee: Sekisui Kaseihin Kogyo Kabushiki Kaisha, Nara, Japan

Reexamination Requests:
No. 90/004,002, Oct. 26, 1995
No. 90/004,143, Feb. 20, 1996

Reexamination Certificate for:
Patent No.: 5,000,991
Issued: Mar. 19, 1991
Appl. No.: 443,416
Filed: Nov. 30, 1989

[30] Foreign Application Priority Data

| Dec. 1, 1988 | [JP] | Japan | 63-302233 |
| Jan. 12, 1989 | [JP] | Japan | 61-3669 |
| Apr. 6, 1989 | [JP] | Japan | 61-88633 |
| Apr. 7, 1989 | [JP] | Japan | 61-88300 |
| Sep. 25, 1989 | [JP] | Japan | 61-250049 |
| Oct. 20, 1989 | [JP] | Japan | 61-273049 |

[51] Int. Cl.$^6$ ............................................. B32B 3/26
[52] U.S. Cl. ................ 428/36.5; 428/319.7; 264/41; 264/46.8; 264/54; 521/138
[58] Field of Search ................ 428/36.5, 319.7, 428/910; 206/557, 524.2, 524.3; 264/41, 46.8, 54, 234, 237, 345, 348; 521/138

[56] References Cited

U.S. PATENT DOCUMENTS

| 4,145,466 | 3/1979 | Leslie et al. | 428/35 |
| 4,176,101 | 11/1979 | Leslie et al. | 260/22 T |
| 4,183,435 | 1/1980 | Thompson et al. | 206/557 |
| 4,466,933 | 8/1984 | Huggard | 264/54 |
| 4,507,338 | 3/1985 | Freundlich | 428/36.5 |
| 4,751,250 | 6/1988 | White et al. | 521/94 |

OTHER PUBLICATIONS

Encyclopedia of Polymer Science and Engineering, vol. 6, John Wiley & Sons, New York, 1986, pp. 52–57.

Chemical Abstracts No. 102: 150596n, vol. 102, 1985 (1 page).

*Primary Examiner*—Kathleen L. Choi

[57] ABSTRACT

A process for producing a thermoplastic polyester resin foam comprising melting a thermoplastic polyester resin, mixing the molten resin with a blowing agent and extruding the mixture into a low-pressure zone to carry out expansion molding, characterized in that a compound having two or more acid anhydride groups per molecule, optionally together with a compound of a metal of Group I, II or III elements of the Periodic Table is added to the thermoplastic polyester resin. There is also disclosed a process for producing a thermoplastic polyester resin foam comprising cooling a high-temperature foam immediately after expansion and then re-heating the foam. Further, a thermoplastic polyester resin foam sheet and a food container prepared from the foam sheet are also disclosed.

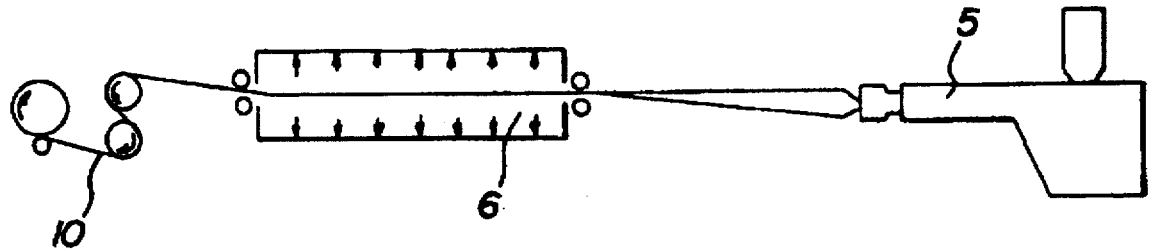

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7, 8, and 10 is confirmed.

Claims 16 and 19 are cancelled.

Claims 1–6, 9, 11–15, 18 and 21 are determined to be patentable as amended.

Claims 17 and 20, dependent on an amended claim, are determined to be patentable.

New claims 22–40 are added and determined to be patentable.

1. A process for producing a thermoplastic polyester resin *crystalline* foam comprising melting a thermoplastic polyester resin, mixing the molten resin with a blowing agent and extruding the mixture into a low-pressure zone to carry out foaming, characterized in that *said extruded foam is subsequently cooled to bring its crystallinity to higher than 7% and that* a compound having two or more acid anhydride groups per molecule is added to the thermoplastic polyester resin.

2. A process for producing a thermoplastic polyester resin *crystalline* foam as in claim 1, wherein said compound having two or more acid anhydride groups per molecule is used in an amount of 0.05 to 5 parts by weight per 100 parts by weight of the thermoplastic polyester resin.

3. A process for producing a thermoplastic polyester resin *crystalline* foam as in claim 1, wherein said compound having two more acid anhydride groups per molecule is pyromellitic dianhydride, benzophenonetetracarboxylic dianhydride, [cyclopentanetetracarboxylic] *cyclopentanetetracarboxylic* dianhydride, diphenyl sulfone tetracarboxylic dianhydride, or 5-(2,5-dioxotetrahydro-3-furanyl)-3 methyl-3-cyclohexene-1,2-dicarboxylic dianhydride.

4. A process for producing a thermoplastic polyester resin *crystalline* foam as in claim 1, wherein said foam has a density of not higher than 0.7 g/cm$^3$.

5. A process for producing a thermoplastic polyester resin *crystalline* foam as in claim 1, wherein said foam is an extruded foam sheet having a density of not higher than 0.5 g/cm$^3$.

6. A process for producing a thermoplastic polyester *crystalline* resin foam as in claim 1, wherein said thermoplastic polyester resin is polyethylene terephthalate, polybutylene terephthalate, polybutylene terephthalate elastomer, an amorphous polyester, polycyclohexane terephthalate, polyethylene naphthalate or a mixture thereof.

9. A process for producing a thermoplastic polyester resin foam as in claim 7, wherein said *metal* elements *are of Group I* of the Periodic Table.

11. A process for producing a thermoplastic polyester resin *crystalline* foam comprising:
*preparing a starting thermoplastic polyester resin in the presence of a compound having two or more acid anhydride groups per molecule,*
*expanding said prepared thermoplastic polyester resin into a foam,*
cooling [a] *said* high-temperature thermoplastic polyester resin foam immediately after expansion to a temperature of not higher than the glass transition point of the resin to bring *its* crystallinity to 30% or lower, and then *post expanding the foam by* heating the foam to 60° C. or higher.

12. A process for producing a thermoplastic polyester resin *crystalline* foam as in claim 11, wherein said heating is carried out by bringing the polyester resin foam into contact with steam or hot water.

13. A process for producing a thermoplastic polyester resin *crystalline* foam as in claim 11, wherein said heating is carried out by bringing the polyester resin foam into contact with a hot plate.

14. A process for producing a thermoplastic polyester resin *crystalline* foam as in claim 11, wherein said foam is re-expanded 1.3 times or more by heating.

15. A thermoplastic resin foam sheet characterized by that said sheet is an extruded foam sheet, *produced by using a circular die and a cylindrical mandrel,* of a thermoplastic polyester resin and has a crystallinity of [not higher than] *about 7 to 20%,* [and] a molecular orientation ratio of 4.5 or lower [looking] *in* the direction from the surface of the foam sheet, *and a density of not higher than 0.7 g/cm$^3$*.

18. A food container produced by laminating a non-foam film of a thermoplastic resin on at least one side of [the] *a* foam sheet *comprising at least 50% by weight* of a thermoplastic polyester resin to obtain a laminated sheet;
*wherein said non-foam film is prepared from thermoplastic polyester resins, liquid crystal polyester resins, polyolefin resins, polyamide resins, polyvinyl chloride resins, polyacrylonitrile resins, polyvinylidene chloride resins or ethylene-vinyl alcohol copolymers,*
*wherein said thermoplastic polyester resin foam has a density of not higher than 0.5 g/cm$^3$, and said thermoplastic polyester resin foam has the property of swelling upon contact with hot water and/or steam and*
*molding the laminated sheet into a container in such a manner that the non-foam film is positioned inside the container*
*whereby preventing hot water and/or steam produced by heating foodstuffs contained within said container from penetrating into the cells of said foam.*

21. A food container as in claim 18, [wherein the crystallinity of the resin is brought to 15% or above and the density of the foam is brought to not higher than 0.5 g/cm$^3$ by thermoforming the laminated sheet] *wherein said thermoplastic resin foam sheet has a crystallinity of about 15% or above.*

22. *A process for producing a thermoplastic polyester resin crystalline foam as in claim 1 wherein said molten resin is mixed with said blowing agent and an expansion nucleating agent.*

23. *A process for producing thermoplastic resin crystalline foam as in claim 1 wherein said thermoplastic resin is a resin having a die swell ratio of 2 to 5.*

24. A process for producing a thermoplastic resin crystalline foam as in claim 1 wherein said compound having two or more acid anhydride groups per molecule is first melt-mixed with a thermoplastic resin, the mixture is pelletized and the pellets are mixed with said thermoplastic polyester resin.

25. A process for producing a thermoplastic polyester resin foam as in claim 7 wherein said compound having two or more acid anhydride groups per molecule and a compound of a metal of Group I, II or III elements of the Periodic Table are first melt-mixed with a thermoplastic resin, the resulting mixture is formed into pellets and said pellets are subsequently mixed with the thermoplastic polyester resin.

26. A process for producing a thermoplastic resin crystalline foam as in claim 11 wherein said thermoplastic polyester resin foam starting resin composition contains said compound having two or more acid anhydride groups per molecule and a compound of a metal of Group I, II or III elements of the Periodic Table.

27. A process for producing a thermoplastic polyester resin crystalline foam as in claim 11 wherein said foam, cooled to a temperature of not higher than the glass transition point of the resin, has a density of not higher than 0.5 g/cm$^3$.

28. A process for producing a thermoplastic polyester resin crystalline foam as in claim 1 further comprising post-expanding the cooled foam by heating it to 60° C. or higher.

29. A process for producing a thermoplastic polyester resin crystalline foam as in claim 28, wherein said foam, cooled to a temperature of not higher than the glass transition point of the resin, has a density of not higher than 0.5 g/cm$^3$.

30. A process for producing a thermoplastic polyester resin crystalline foam as in claim 28, wherein said heating is carried out by bringing the polyester resin foam into contact with steam or hot water.

31. A process for producing a thermoplastic polyester resin crystalline foam as in claim 28, wherein said heating is carried out by bringing the polyester resin foam into contact with a hot plate.

32. A process for producing a thermoplastic polyester resin crystalline foam as in claim 28 wherein said foam is re-expanded 1.3 times or more by heating.

33. A process for producing a thermoplastic polyester resin foam as in claim 7 further comprising cooling said extruded foam and re-expanding the cooled foam by heating it at 60° C. or higher.

34. A process for producing a thermoplastic polyester resin foam as in claim 33, wherein said foam, cooled to a temperature of not higher than the glass transition point of the resin, has a density of not higher than 0.5 g/cm$^3$.

35. A process for producing a thermoplastic polyester resin foam as in claim 33, wherein said heating is carried out by bringing the polyester resin foam into contact with steam or hot water.

36. A process for producing a thermoplastic polyester resin foam as in claim 33, wherein said heating is carried out by bringing the polyester resin foam into contact with a hot plate.

37. A process for producing a thermoplastic polyester resin foam as in claim 33 wherein said foam is re-expanded 1.3 times or more by heating.

38. A food container as claimed in claim 18 wherein said foam sheet comprises closed cells.

39. A food container produced by laminating a non-foam film of a thermoplastic resin on at least one side of a foam sheet comprising at least 50% by weight of a thermoplastic polyester resin to obtain a laminated sheet;

wherein said non-foam film is prepared from thermoplastic polyester resins, liquid crystal polyester resins, polyolefin resins, polyamide resins, polyvinyl chloride resins, polyacrylonitrile resins, polyvinylidene chloride resins or ethylene-vinyl alcohol copolymers, wherein said thermoplastic polyester resin foam has a density of not higher than 0.5 g/cm$^3$, said thermoplastic polyester resin foam sheet has a crystallinity of about 15% or above, and said thermoplastic polyester resin foam sheet has the property of swelling upon contact with hot water and/or steam; and molding the laminated sheet into a container in such a manner that the non-foam film is positioned inside the container whereby preventing hot water and/or steam produced by heating foodstuffs contained within said container from penetrating into the cells of said foam.

40. A food container as claimed in claim 39, wherein the thickness of said laminated sheet is 0.5 to 5 mm.

* * * * *

US005000991B2

REEXAMINATION CERTIFICATE (4118th)

United States Patent [19]

Hayashi et al.

[11] B2 5,000,991

[45] Certificate Issued Jul. 11, 2000

[54] PROCESS FOR PRODUCING POLYESTER RESIN FOAM AND POLYESTER RESIN FOAM SHEET

[75] Inventors: Motoshige Hayashi; Norio Amano; Takeshi Taki; Takaaki Hirai, all of Nara, Japan

[73] Assignee: Sekisui Kaseihin Kogyo Kabushiki Kaisha, Nara, Japan

Reexamination Request:
No. 90/005,317, Apr. 6, 1999

Reexamination Certificate for:
Patent No.: 5,000,991
Issued: Mar. 19, 1991
Appl. No.: 07/443,416
Filed: Nov. 30, 1989

Reexamination Certificate B1 5,000,991 issued Sep. 16, 1997

[30] Foreign Application Priority Data

| Jan. 12, 1989 | [JP] | Japan | 61-3699 |
| Apr. 6, 1989 | [JP] | Japan | 61-88633 |
| Apr. 7, 1989 | [JP] | Japan | 61-88300 |
| Sep. 25, 1989 | [JP] | Japan | 61-250049 |
| Oct. 20, 1989 | [JP] | Japan | 61-273049 |
| Dec. 1, 1999 | [JP] | Japan | 63-302233 |

[51] Int. Cl.$^7$ .................................................. B32B 3/26

[52] U.S. Cl. ...................... 428/36.5; 264/41; 264/46.8; 264/54; 428/319.7; 521/138

[58] Field of Search ...................... 428/36.5, 319.7, 428/910; 206/557, 524.2, 524.3; 264/41, 46.8, 54, 234, 237, 345, 348; 521/138

[56] References Cited

U.S. PATENT DOCUMENTS

| 4,284,596 | 8/1981 | Inokuchi et al. ...................... 264/45.3 |
| 4,981,631 | 1/1991 | Cheung et al. ...................... 264/50 |

FOREIGN PATENT DOCUMENTS

59-210955  11/1984  Japan.

*Primary Examiner*—B. Copenheaver

[57] ABSTRACT

A process for producing a thermoplastic polyester resin foam comprising melting a thermoplastic polyester resin, mixing the molten resin with a blowing agent and extruding the mixture into a low-pressure zone to carry out expansion molding, characterized in that a compound having two or more acid anhydride groups per molecule, optionally together with a compound of a metal of Group I, II or III elements of the Periodic Table is added to the thermoplastic polyester resin. There is also disclosed a process for producing a thermoplastic polyester resin foam comprising cooling a high-temperature foam immediately after expansion and then re-heating the foam. Further, a thermoplastic polyester resin foam sheet and a food container prepared from the foam sheet are also disclosed.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–13, 18, 20, 21, 25–27 and 33–40 is confirmed.

Claims 16 and 19 were previously cancelled.

Claim 5 is cancelled.

Claims 1, 3, 14, 15, 17, 23 and 24 are determined to be patentable as amended.

Claims 2, 4, 6, 22 and 28–32, dependent on an amended claim, are determined to be patentable.

New claims 41–78, and 79 are added and determined to be patentable.

1. A process for producing a thermoplastic polyester resin crystalline foam comprising melting a thermoplastic polyester resin, mixing the molten resin with a blowing agent and extruding the mixture into a low-pressure zone to carry out foaming, characterized in that said extruded foam is subsequently cooled to bring its crystallinity to higher than 7% and that a compound having two or more acid anhydride groups per molecule is added to the thermoplastic resin, *wherein said foam is an extruded foam sheet having a density of not higher than 0.5 g/cm³*.

3. A process for producing a thermoplastic polyester resin crystalline foam as in claim 1, wherein said compound having two *or* more acid anhydride groups per molecule is pyromellitic dianhydride, benzophenonetetracarboxylic dianhydride, [cyclopentanetetracarboxylic] *cyclopentanetetracarboxylic* dianhydride, diphenyl sulfone tetracarboxylic dianhydride, or 5-(2,5-dioxotetrahydro-3-furanyl)-3-methyl-3-cyclohexene-1,2-dicarboxylic dianhydride.

14. A process for producing a thermoplastic polyester resin crystalline foam as in claim 11, wherein *in the post* expanding step, said foam is re-expanded [1.3] *1.37* times or more by heating.

15. A *process for producing a* thermoplastic resin *crystalline* foam sheet [characterized by that said sheet is an extruded foam sheet, produced] *comprising the following steps:*

(a) *providing a thermoplastic polyester resin,*

(b) *melting the thermoplastic polyester resin to obtain a molten resin,*

(c) *mixing the molten resin with a blowing agent to obtain a mixture,*

(d) *extruding the mixture into a low-pressure zone by using a circular die* [and] *to obtain an extruded cylindrical foam,*

(e) *cooling said extruded cylindrical foam by using a cylindrical mandrel,* [of a thermoplastic polyester resin and has] *wherein an outer diameter of the cylindrical mandrel is greater than an outlet diameter of the circular die to obtain* a crystallinity of [not higher than] about 7 to 20%, [and] a molecular orientation ratio of 4.5 or lower [looking] in the direction from the surface of the foam sheet, and a density of not higher than 0.7 g/cm³ *in said cylindrical foam, and thereafter*

(f) *cutting open the cylindrical foam to obtain the thermoplastic polyester resin crystalline foam sheet.*

17. A *process for producing a* thermoplastic resin *crystalline* foam sheet as in claim 15, wherein said sheet is an extruded foam sheet of not more than 5 mm in thickness, *and a density of not higher than 0.5 g/cm³*.

23. A process for producing a thermoplastic resin crystalline foam [as in claim 1] *comprising melting a thermoplastic polyester resin, mixing the molten resin with a blowing agent and extruding the mixture into a low-pressure zone to carry out foaming, characterized in that said extruded foam is subsequently cooled to bring its crystallinity to higher than 7% and that a compound having two or more acid anhydride groups per molecule is added to the thermoplastic polyester resin,* wherein said thermoplastic resin is a resin having a die swell ratio of 2 to 5.

24. A process for producing a thermoplastic resin crystalline foam [as in claim 1] *comprising melting a thermoplastic resin, mixing the molten resin with a blowing agent and extruding the mixture into a low-pressure zone to carry out foaming, characterized in that said extruded foam is subsequently cooled to bring its crystallinity to higher than 7% and that a compound having two or more acid anhydride groups per molecule is added to the thermoplastic polyester resin,* wherein said compound having two or more acid anhydride groups per molecule is first *melt-mixed* with a thermoplastic resin *to form a mixture*, the mixture [is pelletized] *is pelletized* and the pellets are mixed with said thermoplastic polyester resin.

*41. A process for producing a thermoplastic polyester resin crystalline foam comprising the following steps:*

(a) *providing a thermoplastic polyester resin,*

(b) *melting the thermoplastic polyester resin to obtain a molten resin,*

(c) *mixing the molten resin with a blowing agent to obtain a mixture,*

(d) *extruding the mixture into a low-pressure zone to obtain an extruded foam, and thereafter*

(e) *cooling said extruded foam to bring its crystallinity to higher than 7%, wherein a compound having two or more acid anhydride groups per molecule is added to the thermoplastic polyester resin to step (a), (b) or (c) without the addition of a diglycidyl ester compound.*

*42. A process for producing a thermoplastic polyester resin crystalline foam as in claim 41, wherein said compound having two or more acid anhydride groups per molecule is used in an amount of 0.05 to 5 parts by weight per 100 parts by weight of the thermoplastic polyester resin.*

*43. A process for producing a thermoplastic polyester resin crystalline foam as in claim 41, wherein said compound having two or more acid anhydride groups per molecule is pyromellitic dianhydride, benzophenoetetracarboxylic dianhydride, cyclopentanetracarboxylic dianhydride, diphenyl sulfone tetracarboxylic dianhydride, or 5-(2,5-dioxotetrahydro-3-furanyl)-3-methyl-3-cyclohexene-1,2-dicarboxylic dianhydride.*

*44. A process for producing a thermoplastic polyester resin crystalline foam as in claim 41, wherein said foam has a density of not higher than 0.7 g/cm³.*

45. A process for producing a thermoplastic polyester resin crystalline foam as in claim 41, wherein said foam is an extruded foam sheet having a density of not higher than 0.5 g/cm³.

46. A process for producing a thermoplastic polyester resin crystalline foam as in claim 41, wherein said thermoplastic polyester resin is polyethylene terephtalate, polybutylene terephthalate, polybutylene terephthalate elastomer, an amorphous polyester, polycyclohexane terephthalate, polyethylene naphthalate, or a mixture thereof.

47. A process for producing a thermoplastic polyester resin crystalline foam as in claim 41, wherein said molten resin is mixed with said blowing agent and an expansion nucleating agent.

48. A process for producing a thermoplastic polyester resin crystalline foam as in claim 41, wherein said thermoplastic resin is a resin having a die swell ratio of 2 to 5.

49. A process for producing a thermoplastic polyester resin crystalline foam as in claim 41, wherein said compound having two or more acid anhydride groups per molecule is first melt-mixed with a thermoplastic resin, the mixture is pelletized and the pellets are added to the thermoplastic polyester resin.

50. A process for producing a thermoplastic polyester resin crystalline foam as in claim 41, further comprising post-expanding the cooled foam by heating it to a temperature of 60° C. or higher.

51. A process for producing a thermoplastic polyester resin crystalline foam as in claim 50, wherein said foam, cooled to a temperature of not higher than the glass transition point of the resin, has a density of not higher than 0.5 g/cm³.

52. A process for producing a thermoplastic polyester resin crystalline foam as in claim 50, wherein said heating is carried out by bringing the polyester resin foam into contact with steam or hot water.

53. A process for producing a thermoplastic polyester resin crystalline foam as in claim 50, wherein said heating is carried out by bringing the polyester resin foam into contact with a hot plate.

54. A process for producing a thermoplastic polyester resin crystalline foam as in claim 50, wherein said foam is re-expanded 1.37 times or more by heating.

55. A process for producing a thermoplastic polyester resin crystalline foam consisting essentially of (a) providing a thermoplastic polyester resin, (b) melting the thermoplastic polyester resin to obtain a molten resin, (c) mixing the molten resin with a blowing agent to obtain a mixture, (d) extruding the mixture into a low-pressure zone to obtain an extruded foam, and thereafter (e) cooling said extruded foam to bring its crystallinity to higher than 7%, wherein a compound having two or more acid anhydride groups per molecule is added to the thermoplastic polyester resin in step (a), (b) or (c).

56. A process for producing a thermoplastic polyester resin crystalline foam as in claim 55, wherein said compound having two or more acid anhydride groups per molecule is used in an amount of 0.05 to 5 parts by weight per 100 parts by weight of the thermoplastic polyester resin.

57. A process for producing a thermoplastic polyester resin crystalline foam as in claim 55, wherein said compound having two or more acid anhydride groups per molecule is pyromellitic dianhydride, benzophenonetetracarboxylic dianhydride, cyclopentanetetracarboxylic dianhydride, diphenyl sulfone tetracarboxylic dianhydride, or 5-(2,5-dioxotetrahydro-3-furanyl)-3-methyl-3-cyclohexene-1,2-dicarboxylic dianhydride.

58. A process for producing a thermoplastic polyester resin crystalline foam as in claim 55, wherein said foam has a density of not higher than 0.7 g/cm³.

59. A process for producing a thermoplastic polyester resin crystalline foam as in claim 55, wherein said foam is an extruded foam sheet having a density of not higher than 0.5 g/cm³.

60. A process for producing a thermoplastic polyester resin crystalline foam as in claim 55, wherein said thermoplastic polyester resin is polyethylene terephthalate, polybutylene terephthalate, polybutylene terephthalate elastomer, an amorphous polyester, polycyclohexane terephthalate, polyethylene naphthalate, or a mixture thereof.

61. A process for producing a thermoplastic polyester resin crystalline foam as in claim 55, wherein said molten resin is mixed with said blowing agent and an expansion nucleating agent.

62. A process for producing a thermoplastic polyester resin crystalline foam as in claim 55, wherein said thermoplastic resin is a resin having a die swell ratio of 2 to 5.

63. A process for producing a thermoplastic polyester resin crystalline foam as in claim 55, wherein said compound having two or more acid anhydride groups per molecule is first melt-mixed with a thermoplastic resin, the mixture is pelletized and the pellets are added to the thermoplastic polyester resin.

64. A process for producing a thermoplastic polyester resin crystalline foam as in claim 55, wherein the cooled foam is post-expanded by heating to a temperature of 60° C. or higher.

65. A process for producing a thermoplastic polyester resin crystalline foam as in claim 64, wherein said foam, cooled to a temperature of not higher than the glass transition point of the resin, has a density of not higher than 0.5 g/cm³.

66. A process for producing a thermoplastic polyester resin crystalline foam as in claim 64, wherein said heating is carried out by bringing the polyester resin foam into contact with steam or hot water.

67. A process for producing a thermoplastic polyester resin crystalline foam as in claim 65, wherein said heating is carried out by bringing the polyester resin foam into contact with a hot plate.

68. A process for producing a thermoplastic polyester resin crystalline foam as in claim 65, wherein said foam is re-expanded 1.37 times or more by heating.

69. A process for producing a thermoplastic polyester resin crystalline foam comprising:

preparing a starting thermoplastic polyester resin in the presence of a compound having two or more acid anhydride groups per molecule without adding a diglycidyl ester compound, expanding said prepared thermoplastic polyester resin into a foam, cooling said high-temperature thermoplastic polyester resin foam immediately after expansion to a temperature of not higher than the glass transition point of the resin to bring its crystallinity to 30% or lower, and then post expanding the foam by heating the foam to 60° C. or higher.

70. A process for producing a thermoplastic polyester resin crystalline foam as in claim 69, wherein said heating is carried out by bringing the polyester resin foam into contact with steam or hot water.

71. A process for producing a thermoplastic polyester resin crystalline foam as in claim 69, wherein said heating is carried out by bringing the polyester resin foam into contact with a hot plate.

72. A process for producing a thermoplastic polyester resin crystalline foam as in claim 69, wherein in the post expanding step, the polyester resin foam is re-expanded 1.37 times or more by heating.

73. A process for producing a thermoplastic polyester resin crystalline foam as in claim 69, wherein said foam, cooled to a temperature of not higher than the glass transition point of the resin, has a density of not higher than 0.5 g/cm³.

74. A process for producing a thermoplastic polyester resin crystalline foam consisting essentially of:

preparing a starting thermoplastic polyester resin in the presence of a compound having two or more acid anhydride groups per molecule, expanding said prepared thermoplastic polyester resin into a foam, cooling said high-temperature thermoplastic polyester resin foam immediately after expansion to a temperature of not higher than the glass transition point of the resin to bring its crystallinity to 30% or lower, and then post expanding the foam by by heating the foam to 60° C. or higher.

75. A process for producing a thermoplastic polyester resin crystalline foam as in claim 74, wherein said heating is carried out by bringing the polyester resin foam into contact with steam or hot water.

76. A process for producing a thermoplastic polyester resin crystalline foam as in claim 74, wherein said heating is carried out by bringing the polyester resin foam into contact with a hot plate.

77. A process for producing a thermoplastic polyester resin crystalline foam as in claim 74, wherein in the post expanding step, the polyester resin foam is re-expanded 1.37 times or more by heating.

78. A process for producing a thermoplastic polyester resin crystalline foam as in claim 74, wherein said foam, cooled to a temperature of not higher than the glass transition point of the resin, has a density of not higher than 0.5 g/cm³.

79. A process for producing a thermoplastic polyester resin crystalline foam sheet as in claim 15, wherein said sheet has a density of not higher than 0.5 g/cm³, wherein the extruding step is conducted at a ratio of a blow-up ratio/take-off speed of 1.21 to 1.58, wherein the unit for the take-off speed is m/min.

* * * * *